US010388124B2

(12) United States Patent
Levesque et al.

(10) Patent No.: US 10,388,124 B2
(45) Date of Patent: Aug. 20, 2019

(54) HAPTIC DELIVERY CLUSTER FOR PROVIDING A HAPTIC EFFECT

(71) Applicant: IMMERSION CORPORATION, San Jose, CA (US)

(72) Inventors: Vincent Levesque, Montreal (CA); Juan Cruz-Hernandez, Montreal (CA); Vahid Khoshkava, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 16/291,373

(22) Filed: Mar. 4, 2019

(65) Prior Publication Data

US 2019/0197844 A1 Jun. 27, 2019

Related U.S. Application Data

(63) Continuation of application No. 15/852,692, filed on Dec. 22, 2017, now Pat. No. 10,235,849.

(51) Int. Cl.
| | |
|---|---|
| *H04B 3/36* | (2006.01) |
| *G08B 6/00* | (2006.01) |
| *B01J 19/00* | (2006.01) |
| *G05D 7/06* | (2006.01) |

(52) U.S. Cl.
CPC ............ *G08B 6/00* (2013.01); *B01J 19/0006* (2013.01); *G05D 7/0629* (2013.01)

(58) Field of Classification Search
CPC ...... G08B 6/00; B01J 19/0006; G05D 7/0629
USPC ....................................................... 340/407.1
See application file for complete search history.

(56) References Cited

U.S. PATENT DOCUMENTS

| | | | |
|---|---|---|---|
| 2010/0079264 A1* | 4/2010 | Hoellwarth | G06F 3/016 340/407.2 |
| 2012/0113018 A1* | 5/2012 | Yan | G06F 3/04883 345/173 |
| 2012/0162261 A1* | 6/2012 | Kim | G06F 3/017 345/647 |
| 2013/0246441 A1 | 9/2013 | Nashed et al. | |

(Continued)

OTHER PUBLICATIONS

Notification of Transmittal of The International Search Report and The Written Opinion of The International Searching Authority, or The Declaration issued in PCT/US2018/067355, dated Mar. 20, 2019.

*Primary Examiner* — Naomi J Small
(74) *Attorney, Agent, or Firm* — Medler Ferro Woodhouse & Mills PLLC

(57) ABSTRACT

A system having a haptic control unit, a haptic delivery cluster, and an electric field generator, magnetic field generator, or pneumatic actuator is presented. The haptic delivery cluster comprises a plurality of haptic delivery nodes, wherein each haptic delivery node of the plurality of haptic delivery nodes is separate from other haptic delivery nodes of the plurality of haptic delivery nodes, is at least one of a wireless communication device, a sensor, or a computing device, and has a dimension that is less than or equal to 5 mm. The electric field generator, magnetic field generator, or pneumatic actuator is in communication with the haptic control unit and is configured, when activated, to generate an electric field or a magnetic field in a physical environment in which the haptic delivery cluster is located, or to output a pulse of air in the physical environment.

20 Claims, 15 Drawing Sheets

(56) References Cited

U.S. PATENT DOCUMENTS

| | | | |
|---|---|---|---|
| 2013/0249975 A1* | 9/2013 | Davie | G06F 3/016 |
| | | | 345/698 |
| 2014/0168091 A1* | 6/2014 | Jones | G01C 21/3664 |
| | | | 345/173 |
| 2015/0040005 A1* | 2/2015 | Faaborg | H04M 19/047 |
| | | | 715/702 |
| 2016/0246441 A1* | 8/2016 | Westerman | G06F 3/0235 |
| 2017/0031502 A1* | 2/2017 | Rosenberg | G06F 3/017 |

\* cited by examiner

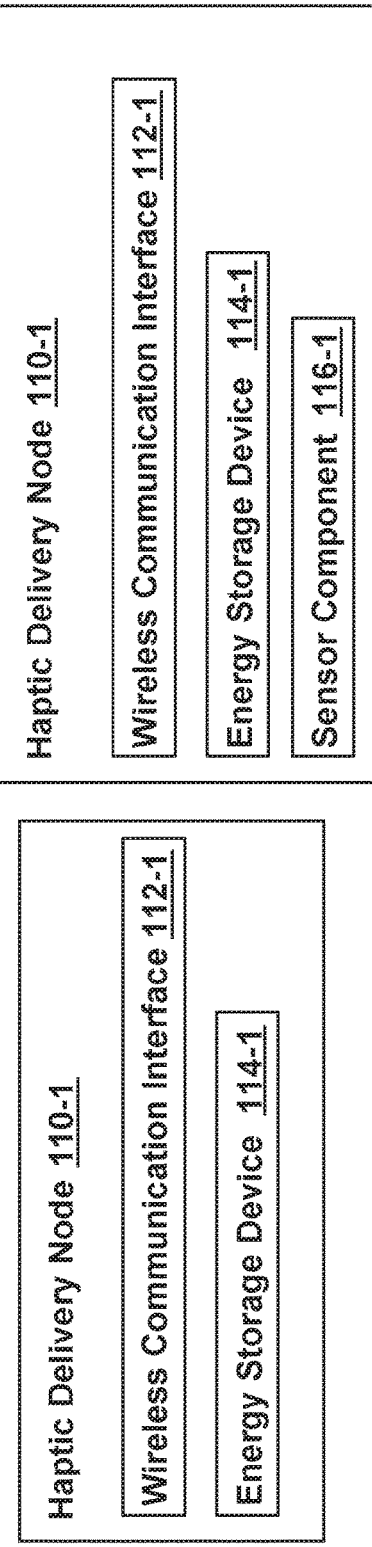
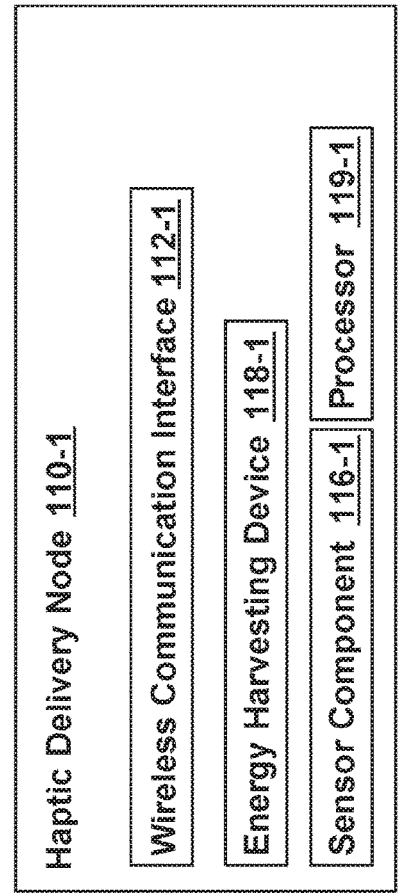
FIG. 2A
FIG. 2B
FIG. 2C

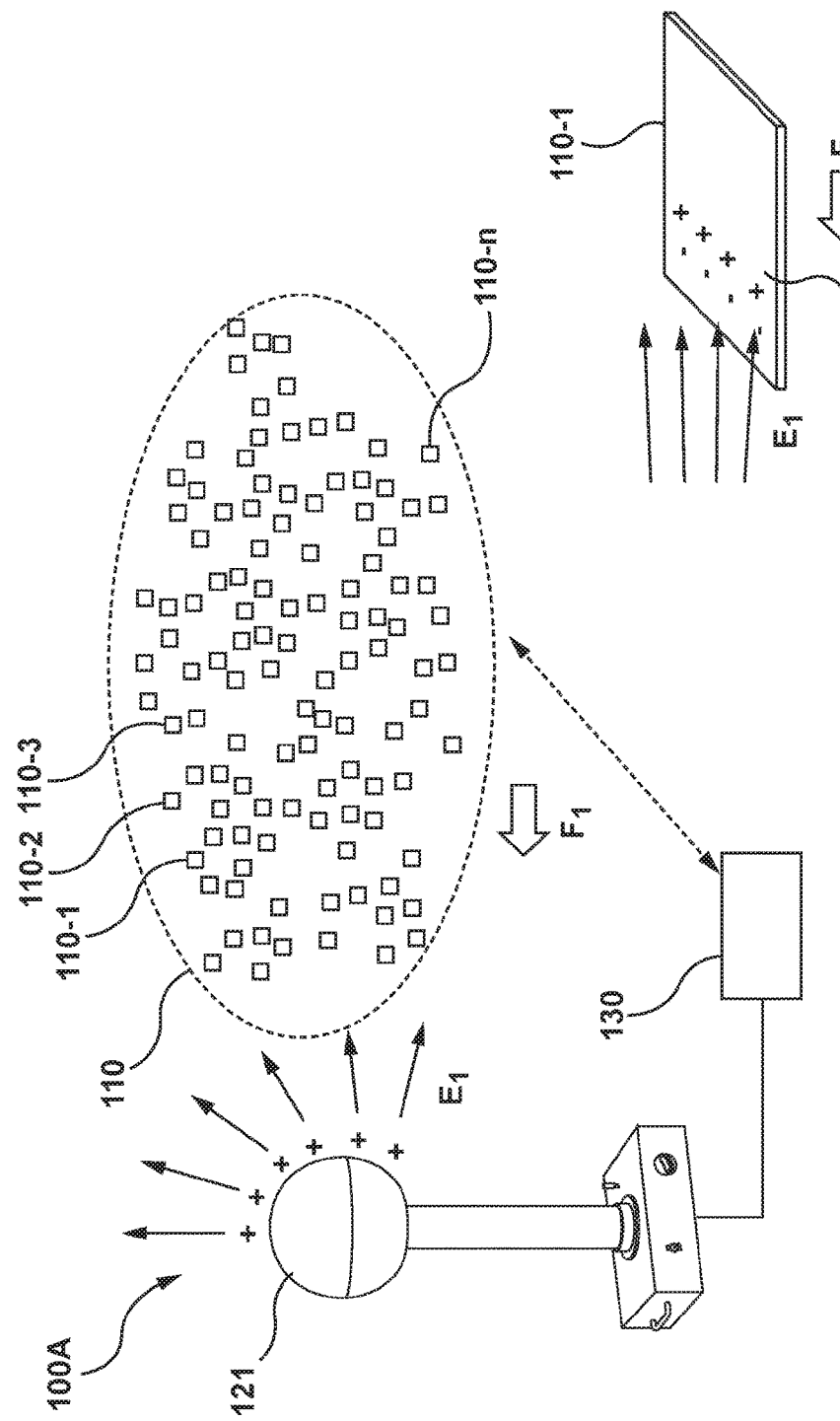
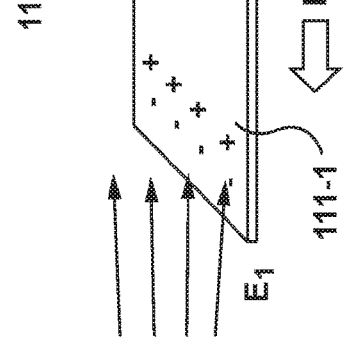
FIG. 4A
FIG. 4B

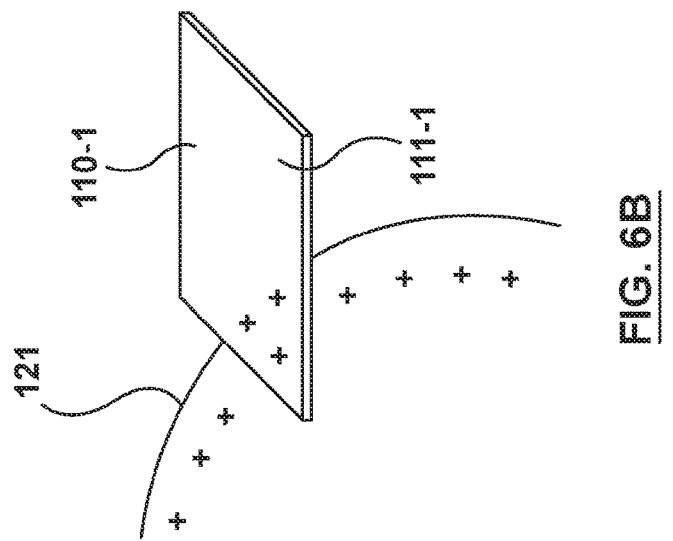
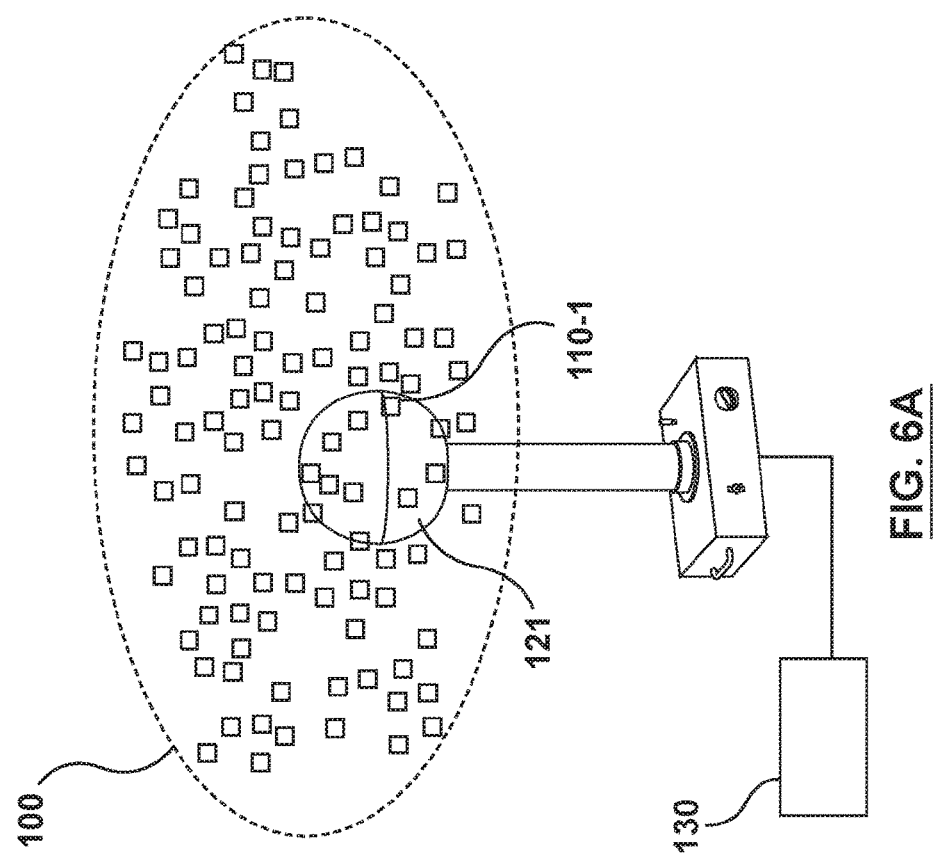

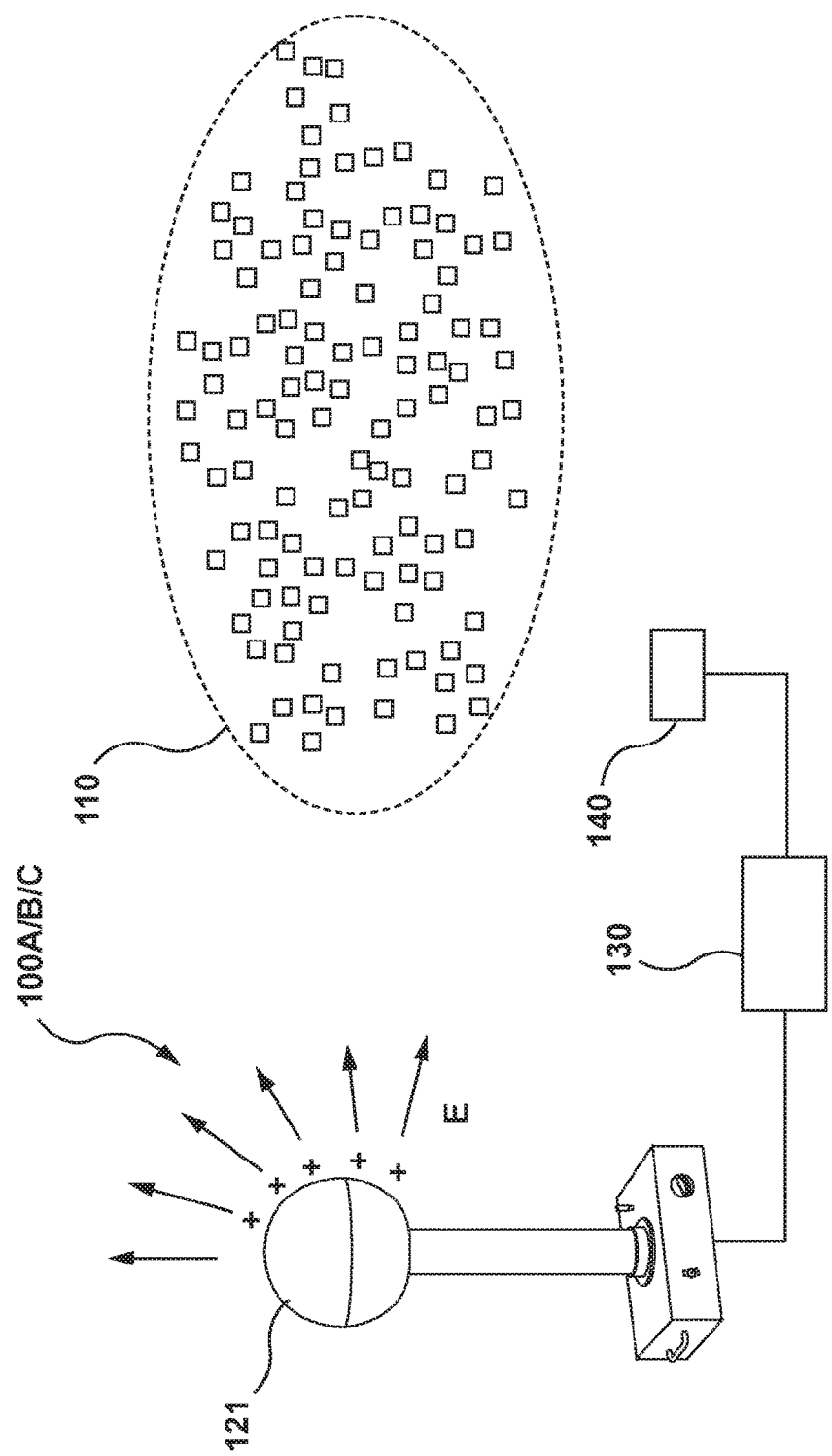

HAPTIC DELIVERY CLUSTER FOR PROVIDING A HAPTIC EFFECT

CROSS-REFERENCE TO RELATED APPLICATIONS

This application is a continuation of U.S. patent application Ser. No. 15/852,692, filed Dec. 22, 2017, the entire content of which is hereby incorporated by reference in its entirety.

FIELD OF THE INVENTION

The present invention is directed to a haptic delivery cluster for providing a haptic effect, and has application in user interfaces, gaming, and consumer electronics.

BACKGROUND

As electronic user interface systems, such as a system for providing virtual environments, become more prevalent, the quality of the interfaces through which humans interact with these environments is becoming increasingly important. Haptic feedback, or more generally haptic effects, can improve the quality of the interfaces by providing cues to users, providing alerts of specific events, or providing realistic feedback to create greater sensory immersion within the virtual environments. Examples of haptic effects include kinesthetic haptic effects on a game controller, or vibrotactile haptic effects on a mobile phone.

SUMMARY

The following detailed description is merely exemplary in nature and is nor intended to limit the invention or the application and uses of the invention. Furthermore, there is no intention to be hound by any expressed or implied theory presented in the preceding technical field, background, brief summary or the following detailed description.

One aspect of the embodiments herein relate to a system for providing haptic effects, the system comprising a haptic control unit, a haptic delivery cluster, and an electric field generator. The haptic delivery cluster comprises a plurality of haptic delivery nodes, wherein each haptic delivery node of the plurality of haptic delivery nodes is separate from other haptic delivery nodes of the plurality of haptic delivery nodes, is at least one of a wireless communication device, a sensor, or a computing device, and has a dimension that is less than or equal to 5 mm. The electric field generator is in communication with the haptic control unit and configured, when activated, to generate an electric field in a physical environment in which the haptic delivery cluster is located. The haptic control unit is configured to activate the electric field generator to cause movement of the plurality of haptic delivery nodes of the haptic delivery cluster toward a location at which user presence is detected.

In an embodiment the haptic control unit is further configured to detect the user presence its the physical environment in which the haptic delivery cluster is located, and to determine the location at which the user presence is detected. The control unit is further configured, after detecting the user presence, to determine whether to generate a haptic effect with the haptic delivery cluster. The electric field generator is activated in response to a determination to generate the haptic effect with the haptic delivery cluster.

In an embodiment, a total number of the plurality of haptic delivery nodes in the haptic delivery cluster is in a range of 1,000 to 100,000 haptic delivery nodes, and wherein the haptic delivery cluster occupies an area that is in a range of 25 $cm^2$ to 1 $m^2$.

In an embodiment, each haptic delivery node of the plurality of haptic delivery nodes of the haptic delivery cluster is floatable in air.

In an embodiment, each haptic delivery node of the plurality of haptic delivery nodes has a dimension that is a range of 100 µm to 1 mm.

In an embodiment, each haptic delivery node of the plurality of haptic delivery nodes includes: a wireless communication interface configured to communicate with the haptic control unit; a sensor component configured to sense a parameter of the physical environment in which the haptic delivers cluster is located; and at least one of an energy storage device or an energy harvesting device;

In an embodiment, each haptic delivery node of the plurality of haptic delivery nodes of the haptic delivery cluster is formed from a dielectric material that is configured to be electrically polarized by the electric field generated by the electric field generator. The electric field generator is configured to accumulate a net electric charge that attracts the dielectric material of each haptic delivery node of the plurality of haptic delivery nodes, such that activation of the electric field generator causes movement of the plurality of haptic delivery nodes of the haptic delivery cluster toward the electric field generator. The haptic control unit is configured to activate the electric field generator only in response to a determination that the location at which the user presence is detected is between the electric field generator and the haptic delivery cluster.

In an embodiment, each haptic delivery node of the plurality of haptic delivery nodes of the haptic delivery cluster has a net electric charge, and wherein the electric field generator is configured to accumulate a net electric charge having a same polarity as the net electric charge of each haptic delivery node, such that activation of the electric field generator causes movement of the plurality of haptic delivery nodes of the haptic delivery cluster away from the electric field generator. The haptic control unit is configured to activate the electric field generator only in response to a determination that the haptic delivery cluster is between the electric field generator and the location at which the user presence is detected.

In an embodiment, the electric field generator is configured to transfer electric charge to at least a subset of haptic delivery nodes of the plurality of haptic delivery nodes of the haptic delivery cluster.

In an embodiment, the electric field generator is a first electric field generator, and wherein the system further comprises a second electric field generator configured to accumulate a net electric charge that is opposite in polarity to the net electric charge of each haptic delivery node of the plurality of haptic delivery nodes of the haptic delivery cluster, such that activation of the second electric field generator attracts the plurality of haptic delivery nodes of the haptic delivery cluster toward the second electric field generator.

In an embodiment, the system further comprises a magnetic field generator configured, when activated, to generate a magnetic field in the physical environment in which the haptic delivery cluster is located. The haptic control unit is configured to determine a path of movement of at least a subset of haptic delivery nodes of the haptic delivery cluster if the magnetic field generator is activated. The haptic control unit is further configured to determine if the location at which the user presence is detected is on the path of movement of at least the subset of haptic delivery nodes of the haptic delivery cluster. The haptic control unit is further configured, in response to a determination that the location at which the user presence is detected is on the path of movement of at least the subset of haptic delivery nodes, to activate the magnetic field generator.

In an embodiment, each haptic delivery node of the plurality of haptic delivery nodes of the haptic delivery cluster is a microelectromechanical systems (MEMS) device.

In an embodiment, each haptic delivery node of the plurality of haptic delivery nodes is a MEMS sensor that includes at least one of a MEMS pressure transducer, a MEMS audio transducer, or a MEMS light sensor.

In an embodiment, each haptic delivery node of the plurality of haptic delivery nodes stores at least two chemical materials separated by at least one MEMS gate, and includes a control circuit configured to open the at least one MEMS gate to allow the at least two chemical materials to mix to generate a chemical reaction, wherein release of thermal energy by the chemical reaction, absorption of thermal energy by the chemical reaction, or pressure from the chemical reaction generates the haptic effect.

In an embodiment, the at least two chemical materials includes a first material that is at least one of potassium nitrate, potassium chlorate, and potassium perchlorate, and includes a second material that is at least one of silver fulminate, charcoal powder, aluminum powder, and phosphorus powder.

In an embodiment, each haptic delivery node of the plurality of haptic delivery nodes further stores a plurality of particles that are configured to be propelled by the chemical reaction away from the haptic delivery node.

In an embodiment, the haptic control unit is configured to determine whether to open the at least one MEMS gate of each haptic delivery node of the plurality of haptic delivery nodes based on a determination of whether a distance between a location at which the user presence is detected and one or more haptic delivery nodes of the plurality of haptic delivery nodes is equal to or less than a defined threshold. The haptic control unit is configured, in response to a determination to open the at least one MEMS gate of each haptic delivery node of the plurality of haptic delivery nodes, to wirelessly communicate a command to each of the haptic delivery node of the plurality of haptic delivery nodes to cause the respective haptic delivery node to open the at least one MEMS gate thereof.

In an embodiment, the system further comprises a pneumatic actuator configured, when activated, to output one or more pulses of air to cause movement of the plurality of haptic delivery nodes of the haptic delivery cluster.

In an embodiment, the pneumatic actuator is an ultrasound device.

In an embodiment, the system further comprises a tracking sub-system configured to track location of a user, wherein the haptic control unit is configured to use the tracking sub-system to determine the location at which the user presence is detected, and wherein the tracking sub system comprises at least one of a proximity sensor, a camera, and a location sensor worn by the user.

In an embodiment, the system further comprises a vibrotactile actuator configured to generate vibrations, wherein each haptic delivery node of the plurality of haptic delivery nodes includes an energy harvesting device configured to convert the vibrations to electrical energy.

One aspect of the embodiments herein relates to a system for providing haptic effects, the system comprising a haptic control unit, a haptic delivery cluster, and a magnetic field generator. The haptic delivery cluster comprises a plurality of haptic delivery nodes, wherein each haptic delivery node of the plurality of haptic delivery nodes is separate from other haptic delivery nodes of the plurality of haptic delivery nodes, is at least one of a wireless communication device, a sensor, or a computing device, and has a dimension that is less than or equal to 5 mm, and has a net electric charge or a net magnetic dipole. The magnetic field generator is in communication with the haptic control unit and is configured, when activated, to generate a magnetic field in a physical environment in which the haptic delivery cluster is located. The haptic control unit is configured to activate the magnetic field generator to cause movement of the plurality of haptic delivery nodes of the haptic delivery cluster toward a location at which user presence is detected.

In an embodiment, the haptic control unit is further configured to detect the user presence in the physical environment, in which the haptic delivery cluster is located, and to determine the location at which the user presence is detected. The control unit is further configured, after detecting the user presence, to determine whether to generate the haptic effect with the haptic deliver cluster. The magnetic field generator is activated in response to a determination to generate the haptic effect with the haptic delivery cluster.

In an embodiment, the haptic control unit is configured to determine a path of movement of at least a subset of haptic delivery nodes of the haptic delivery cluster if the magnetic field generator is activated. The haptic control unit is further configured to determine if the location at which the user presence is detected is on the path of movement of at least the subset of haptic delivery nodes of the haptic delivery cluster. The haptic control unit is further configured, in response to a determination that the location at which the user presence is detected is on the path of movement of at least the subset of haptic delivery nodes, to activate the magnetic field generator.

In an embodiment, the magnetic field generator includes a conductive coil and a current source.

One aspect of the embodiments hereof relates to a system for providing haptic effects, the system comprising a haptic control unit, haptic delivery cluster, and a pneumatic actuator. The haptic delivery cluster comprises a plurality of haptic delivery nodes, wherein each haptic delivery node of the plurality of haptic delivery nodes is separate from another, is at least one of a wireless communication device, a sensor, and computing device, and has a dimension that is less than or equal to 5 mm. The pneumatic actuator is in communication with the haptic control unit and is configured, when activated, to output a pulse of air in the physical environment in which the haptic delivery cluster is located, to cause movement of the plurality of haptic delivery nodes of the haptic delivery cluster. The haptic control unit is configured to activate the pneumatic actuator to cause movement of the plurality of haptic delivery nodes of the haptic delivery cluster toward the location at which the user presence is detected.

In an embodiment, the haptic control unit is further configured to detect the user presence in the physical environment in which the haptic delivery cluster is located, and to determine the location at which the user presence is detected. The haptic control unit is further configured, after detecting the user presence, to determine whether to generate the haptic effect with the haptic delivery cluster. The pneumatic actuator is activated in response to the determination to generate the haptic effect with the haptic delivery cluster.

In an embodiment, the haptic control unit is configured to activate the pneumatic actuator only in response to a determination that the plurality of delivery nodes of the haptic delivery cluster is between the pneumatic actuator and the location at which the user presence is detected.

BRIEF DESCRIPTION OF THE DRAWINGS

The foregoing and other features, objects and advantages of the invention will be apparent form the following detailed description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIGS. 2A-2C depict block diagrams of a haptic delivery node haptic delivery cluster, according to embodiments hereof.

FIGS. 4A and 4B depict a system for providing a haptic effect with a haptic delivery cluster, which the system includes an electric field generator, according to an embodiment hereof.

FIGS. 6A and 6B illustrate a system for providing a haptic effect with a haptic delivery cluster, in which an electric field generator transfers charge to at least some haptic delivery nodes of the haptic delivery cluster, according to an embodiment hereof.

FIG. 7A illustrates a system for providing a haptic effect with a haptic delivery cluster, in which the system includes a sensor for tracking user location, according to an embodiment hereof.

DETAILED DESCRIPTION

Figure 1:
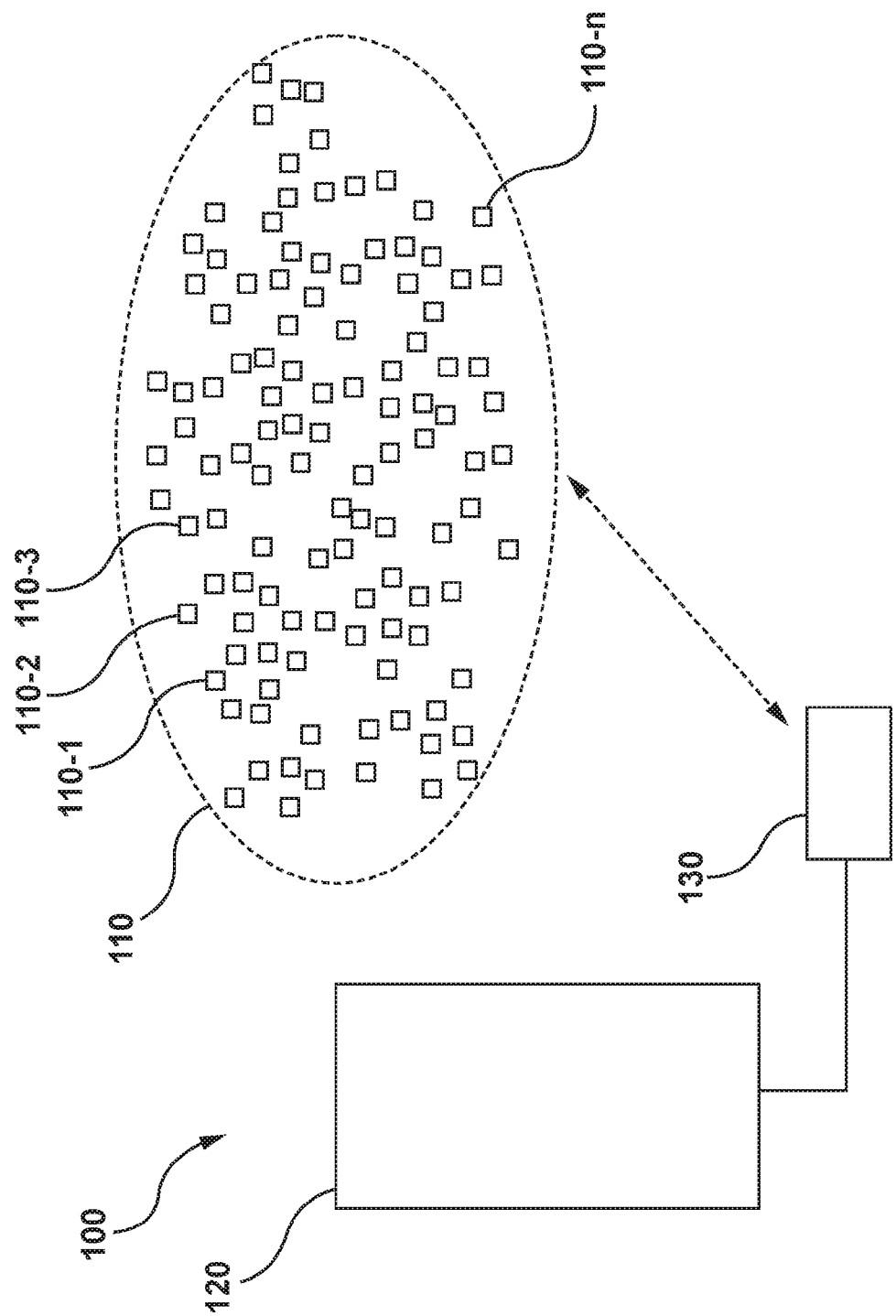
FIG. 1 depicts a system for providing a haptic effect with a haptic delivery cluster, according to an embodiment hereof.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments hereof relate to using a haptic delivery cluster of small haptic delivery nodes to provide a haptic effect, wherein the haptic delivery cluster may colloquially be referred to as smart dust. For instance, the haptic delivery cluster may, in an implementation, be smart dust that is deployed in a physical environment, such as a living room, an office, or other physical environment. The haptic delivery cluster may be formed as a system of many separate small electronic devices (e.g., sensors, wireless communication devices, and/or computing devices) that are light enough to float in air. In some instances, the electronic devices of the smart dust may function as an Internet of Things (IoT) network. For example, the electronic devices of the smart dust may be configured to wirelessly communicate with each other and/or with a wireless access point (WAP) to receive commands or other information from the WAP, transmit information (e.g., sensor information) to the WAP, or a combination thereof.

In an embodiment, the haptic delivery cluster (e.g., smart dust) may include a plurality of haptic delivery nodes, which may include the electronic devices illustrated above, or may include other types of electronic devices. The haptic delivery nodes may also be referred to as haptic delivery motes. Each of the haptic delivery nodes may be light enough so as to be able to float (or be otherwise suspended) in air when the haptic delivery cluster is deployed, or may in some cases be too heavy to float in air. While the temperature and pressure of air may vary across different physical environments at different locations, in some cases the haptic delivery nodes may be sufficiently buoyant to be able to float for a range of air temperature and air pressure. For example, each of the haptic delivery nodes may be sufficiently buoyant to be able to float for an air temperature that is in a range of 20° C. to 25° C., and an air pressure that is around 25 inHg of mercury to 35 inHg of mercury, or more specifically at around 1 atmosphere, or 30 inHg of mercury. For example, each haptic delivery node may have a size that is in a range of 1 to 10 micron or 1 to 50 micron. In an embodiment, each haptic delivery node may have at least one surface with a surface area that is large enough such that a product of the surface area multiplied by the air pressure is equal to or greater than a weight of the haptic delivery node. In some instances, each of the haptic delivery nodes may have a dimension that is on the millimeter scale, micron scale, or even nanometer scale, as discussed below in more detail. In some instances, a total number of haptic delivery nodes deployed in the haptic delivery cluster may be on a scale of hundreds of haptic delivery nodes, thousands of haptic delivery nodes, millions of haptic delivery nodes, or even billions of haptic delivery nodes.

In an embodiment, a haptic delivery cluster may be used to deliver or otherwise generate haptic effect. The haptic effect may be generated via impact of the haptic delivery nodes against a user, via electrostatic discharge from the haptic delivery nodes onto the user, via a chemical reaction of materials disposed on the haptic delivery nodes, or a combination thereof. For instance, a system in accordance with embodiments hereof may include a haptic delivery cluster and a force generator configured to exert a force to propel or otherwise more haptic delivery nodes of the haptic delivery cluster toward a user. The force generator may include, e.g., an electric field generator, a magnetic field generator, or a pneumatic actuator, as described below in more detail. In some instances, the haptic delivery nodes may be electrically neutral, but may include material that is susceptible to being polarized by an electric field from an electric field generator, or susceptible to being magnetized by a magnetic field from a magnetic field generator. After the material of the haptic delivery nodes is polarized or magnetized, the electric field generator or magnetic field generator may exert a force on the material so as to move the haptic delivery nodes. In some instances, the haptic delivery nodes may have a net electric charge or a net magnetic dipole when they are deployed in a physical environment. In such instances, the electric field from the electric field generator or the magnetic field from the magnetic field generator may be configured to exert a force on the haptic delivery nodes. The force exerted by the electric field generator, magnetic field generator, and/or pneumatic actuator may move the haptic delivery nodes to collide with a user, and thereby deliver a haptic effect to a user. While the force of impact from a single collision (a collision between a single haptic delivery node and a user) may be small, the combined effect of many collisions from many haptic delivery nodes (e.g., thousands, millions, or even billions of haptic delivery nodes) is sufficient to be perceived by a user as a haptic effect.

As stated above, a haptic effect may in some instances be generated via electrostatic discharge. In an embodiment, the electrostatic discharge may involve a haptic delivery node that has a net electric charge colliding with a user. The collision may cause the haptic delivery node to, e.g., come into contact with the user's skin, and the net electric charge on the haptic delivery node may be discharged onto the user's skin. The discharge may occur upon contact or right before contact with the user's skin. The electrostatic discharge may be perceived as a small static shock by the user, who may feel the static shock as a tingling, tactile sensation. The combined effect of electrostatic discharge from many haptic delivery nodes is sufficient to be perceived by a user as a haptic effect. In some cases, the electric field generator recited above may also be a charge generator configured to accumulate a net electric charge. The charge generator may be configured to transfer electric charge onto the haptic delivery nodes, which then later discharge the electric charge onto the user.

As stated above, a haptic effect may in some instances be generated via a chemical reaction. In an embodiment, the haptic delivery nodes of the haptic delivery cluster may include material that can chemically react to generate heat (or absorb heat), pressure, or a combination thereof. For instance, the haptic delivery nodes may each store a small amount (e.g., 100 µg) of pyrotechnic material(s) that may be able to chemically react to generate a small explosion. The small explosions from many haptic delivery nodes will generate heat and pressure (e.g., a pulse of air) that is perceived by a user as a haptic effect. In some cases, the haptic delivery nodes may further store a plurality of small particles, e.g., beads, that will be propelled outward by the small explosion to impact the user. The force of impact from a single particle/bead may be small, but the combined effect of impact from beads from many haptic delivery nodes is sufficient to be perceived by the user as a haptic effect.

In an embodiment, the haptic deliver cluster may be used to generate a haptic effect in a virtual reality (VR) environment or augmented reality (AR) environment. For instance, in a VR environment in which a user is wearing a head-mounted device (HMD), the HMD may depict a cluster of virtual objects that can come into virtual contact with the user. The virtual objects may be, e.g., sand particles of a virtual sand storm, or a swarm of virtual bees in a VR game. The haptic delivery cluster may be deployed in a physical environment, such as a living room in which the user is playing the VR game, and may be used to represent the cluster of virtual objects. In an embodiment, the haptic delivery cluster may be used to simulate the virtual sand storm or the swarm of virtual bees colliding with the user in the VR or AR environment. For instance, a tracking subsystem may track or otherwise determine a user's physical location, and the force generator may be activated to exert a force on the haptic delivery nodes of the haptic delivery cluster in a direction toward the physical location of the user, e.g., a location at which user presence is detected. In an embodiment, the haptic deliver cluster may be directed to a specific body part, such as a user's hand. For instance, in a VR or AR environment, the haptic delivery cluster may represent virtual objects such as blades of grass or flower petals. When the user's hand is reaching for the virtual blades of grass or flower petals, the haptic delivery cluster may be directed to the user's hand to deliver a haptic effect. In an embodiment, the haptic delivery cluster may augment a haptic output device carried by or attached to the user, e.g., on a mobile phone carried by the user or on an electronic watch worn by the user, or a haptic output device installed in the physical environment. In an embodiment, the haptic delivery cluster may replace such a haptic output device altogether.

FIG. 1 illustrates a system 100 for providing a haptic effect, in which the system 100 includes a haptic delivery cluster 110, a force generator 120, and a haptic control unit 130. The haptic delivery cluster 110 (e.g., smart dust) may include a plurality of separate haptic delivery nodes 110-1, 110-2, 110-3 . . . 110-n, which may also be referred to as haptic delivery motes. The plurality of haptic delivery nodes 110-1 to 110-n may be separate in that, e.g., they are not directly or indirectly physically attached to each other. In an embodiment, each haptic delivery node of the plurality of haptic delivery nodes 110-1 to 110-n of the haptic delivery cluster 110 may be at least one of a wireless communication device, a sensor, or a computing device. For instance, each haptic delivery node of the plurality of haptic delivery nodes 110-1 to 110-n may be a sensor, that the haptic delivery cluster 110 is a sensor cluster, which can be deployed in a physical environment to sense, e.g., detect, measure, or monitor, a physical parameter, such as temperature, pressure, humidity, light intensity level, sound level, presence of a chemical substance, e.g., an air pollutant, or presence of an object, e.g., user presence. As stated above, all or some of the haptic delivery nodes 110-1 to 110-n may be a wireless communication device, which may be capable of wirelessly communicating with each other, and/or wirelessly communicating with the haptic control unit 130. The wireless communication functionality may allow the haptic delivery nodes 110-1 to 110-n to form a communication network, e.g., an IoT network, In an embodiment, the haptic delivery nodes 110-1 to 110-n of the haptic delivery cluster 100 may be stored in a container before the haptic delivery nodes 110-1 to 110-n are deployed. For instance, the container may be a box that is in the physical environment.

In an embodiment, each haptic delivery node of the plurality of haptic delivery nodes 110-1 to 110-n may have a small dimension, so as to remain inconspicuous in a physical environment in which it is deployed. For instance, each haptic delivery node of the plurality of haptic delivery nodes may have a dimension that is on the order of millimeters or microns. In an embodiment, each haptic delivery node of the plurality of haptic delivery nodes 110-1 to 110-n may have a dimension, e.g., length or width, that is less than or equal to 5 mm, or less than or equal to 1 mm, as discussed below in more detail. In an embodiment, a total number of separate haptic delivery nodes 110-1 to 110-n in the haptic delivery cluster 110 may be in a range of 1,000 to 100,000, a range of 100,000 to 10 million, a range of 10 million to 1 billion, or some other range. In an embodiment, the haptic delivery cluster 110 may take an amorphous cloud-like shape and occupy an area that is in a range of 25 cm$^2$ (e.g., 5 cm×5 cm) to 1 m$^2$ (e.g., 1 m×1 m), or some other range. In an embodiment, the haptic delivery cluster 110 may occupy a volume that is in a range of 125 cm$^3$ (e.g., 5 cm×5 cm×5 cm) to 1 m$^3$ (e.g., 1 m×1 m×1 m), or some other range.

In FIG. 1, the haptic control unit 130 may be in wired or wireless communication with the force generator 120. The communication may allow the haptic control unit 130 and the force generator 120 to exchange information, which may include a command signal to activate or deactivate the force generator 120. In an embodiment, the haptic control unit 120 may be configured to determine whether to generate a haptic effect with the haptic delivery cluster 110. In some cases, this determination may be made after the haptic control unit 130 detects user presence in a physical environment in which the haptic delivery cluster 110 is located, e.g., a living room in which a user is playing a VR game. In an embodiment, the haptic control unit 130 may, in response to a determination to generate a haptic effect with the haptic delivery cluster 110, activate the force generator 120. In an embodiment, the haptic control unit 130 may be configured to determine whether to generate a haptic effect in response to a command from an application (e.g., game application) executing the VR or AR environment on a desktop computer, game console, or other platform. In an embodiment, the haptic control unit 130 may be configured to determine a location of virtual objects in the VR or AR environment, a location of, e.g., a user's avatar in the VR or AR environment, and determine to generate a haptic effect when the location of the virtual objects and the location of the avatar are the same.

The haptic control unit 130 may, in an embodiment, be implemented as a processor (e.g., microprocessor), field programmable gate array (FPGA), application specific integrated circuit (ASIC), programmable logic array (PLA), or other control circuit. The haptic control unit 130 may be part of a general purpose control circuit, such as a processor for executing an application that provides a VR or AR environment, or may be a control circuit dedicated to controlling haptic effects. In an embodiment, the haptic control unit 130 may be part of a desktop computer, a mobile computing device, e.g., a mobile phone, or some other computing device.

In an embodiment, the haptic control unit 30 may be configured to wirelessly communicate with the plurality of haptic delivery nodes 110-1 to 110-n of the haptic delivery cluster 110. For instance, the haptic control unit 130 may be configured to receive sensor information from the plurality of haptic delivery nodes 110-1 to 110-n. In some cases, the information from the haptic delivery nodes 110-1 to 110-n may be used in determining whether or how to generate a haptic effect. As an example, if one or more of the haptic delivery nodes 110-1 to 110-n include proximity sensors that detect user presence in a physical environment, an indication of user presence from the proximity sensors may be used to trigger a haptic effect. In some cases, the haptic control unit 130 may simply act as a wireless access point (WAP) configured to receive information from the haptic delivery nodes 110-1 to 110-n and relay the information to another device, such as a server configured to process sensor information.

In an embodiment, the force generator 120 may be configured to exert a force on the plurality of haptic delivery nodes 110-1 to 110-n of the haptic delivery cluster 110, so as to move the haptic delivery nodes 110-1 to 110-n and the haptic delivery cluster as a whole toward a user. The force generator 120 may be, e.g., an electric field generator, a magnetic field generator, a pneumatic actuator, some other force generator, or a combination thereof. In an embodiment, the force generator may have an effective range of, e.g., 0.5 m to 10 m, 1 m to 20 m, or some other range. The force generator 120 may be selectively activated or deactivated by the haptic control unit 130.

FIGS. 2A-2C illustrate various embodiments of a haptic delivery node 110-1 of the plurality of haptic delivery nodes 110-1 to 110-n of the haptic delivery cluster 110. The other haptic delivery nodes 110-2 to 110-n may be the same as the haptic delivery node 110-1, or may be different than the haptic delivery node 110-1. The haptic delivery node 110-1 of FIG. 2A is a wireless communication device. For instance, in the embodiment of FIG. 2A, the haptic delivery node 110-1 may include a wireless communication interface 112-1 and an energy storage device 114-1. The wireless communication interface 112-1 may include an antenna, and may in some instances include a digital signal processing (DSP) circuit configured to prepare information (e.g., sensor information) for wireless transmission, and/or configured to process information received wirelessly from, e.g., the haptic control unit 130. The energy storage device 114-1 may include at least one of a battery, e.g., a graphene-based battery, or a capacitor. In an embodiment, the components 112-1 and 114-1 may be the only components of the haptic delivery node 110-1. In an embodiment, the haptic delivery node 110-1 of FIG. 2A may also be a computing device if the wireless communication interface 112-1 has a DSP circuit.

The haptic delivery node 110-1 of FIG. 2B is a sensor. In the embodiment of FIG. 2B, the haptic delivery node 110-1 includes not only the wireless communication interface 112-1 and the energy storage device 114-1 of FIG. 2A, but further includes a sensor component 116-1. In some instances, the sensor component 116-1 may be configured to sense e.g., detect, measure, or monitor, a parameter of a physical environment in which the haptic delivery node 110-1 is deployed or otherwise located. The parameter may include, e.g., a temperature, a pressure, a humidity level, a light intensity level light frequency level, a sound level, presence of a substance, e.g., a chemical substance such as a pollutant, or presence of an object, e.g., a user, in the physical environment. In an embodiment, the sensor component 116-1 may include a microelectromechanical system (MEMS) device configured to perform the sensing functionality. For instance, the sensor component 116-1 may include a MEMS pressure transducer configured to sense barometric pressure in the physical environment, or a MEMS audio transducer configured to measure sound level in the physical environment, or a MEMS light sensor. In an embodiment, the sensor component 116-1 may include a system-on-a-chip (SoC) component to, e.g., sense a light intensity level or detect presence of a chemical substance in the physical environment. In an embodiment, the wireless communication interface 112-1, energy storage device 114-1, and sensor component 116-1 may be the only components of the haptic delivery node 110-1. In an embodiment, the haptic delivery node 110-1 is not a MEMS device.

The haptic delivery node 110-1 of FIG. 2C is a computing device. In FIG. 2C, the haptic delivery node 110-1 includes a processor 119-1 configured to, e.g., process sensor information, command information, or other information. In an embodiment, the processor 119-1 may be separate from any DSP of the wireless communication interface 11201. In an embodiment, the haptic delivery node 110-1 may be formed as a computer chip.

In the embodiment of FIG. 2C, the haptic delivery node 110-1 further includes the wireless communication interface 112-1, the sensor component 116-1, and an energy harvesting device 118-1. The energy harvesting device 118-1, which may also be referred to as an energy scavenging device, may be combined with the energy storage device 114-1 of FIG. 2B, or may replace the energy storage device 114-1. The energy harvesting device 118-1 may be configured to extract energy from the physical environment in which the haptic delivery node 110-1 is located. For instance, the energy harvesting device 118-1 may include a silicon photovoltaic layer formed on a substrate of the haptic delivery node 110-1, a piezoelectric layer configured to be deformed by a vibration in the physical environment and to convert the deformation to a voltage, a thermocouple configured to extract energy from temperature fluctuations in the physical environment, an antenna configured to capture radio frequency (RF) energy in the physical environment, or some combination thereof. In an embodiment, any antenna of the energy harvesting device 118-1 may also be an antenna of the wireless communication interface 112-1, or may be a different antenna.

Figure 3:
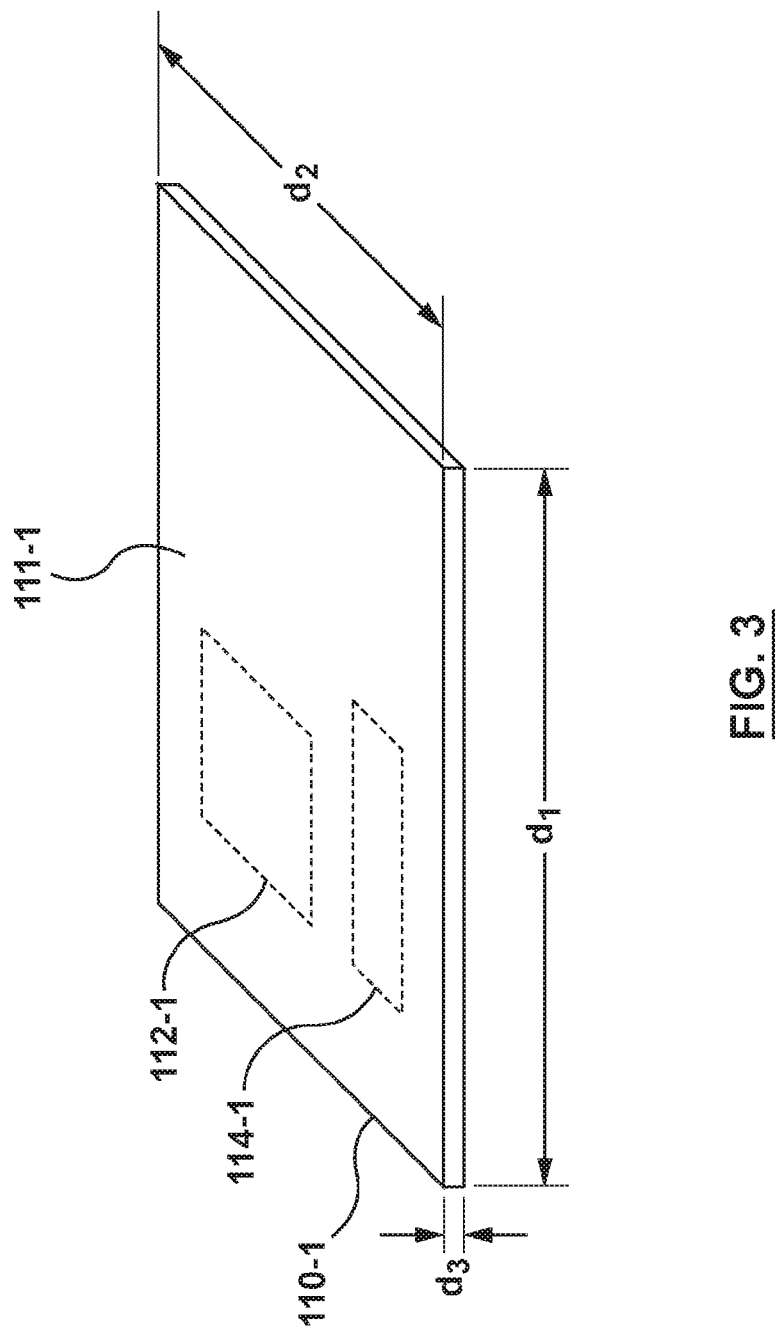
FIG. 3 depicts a perspective view of a haptic delivery node of a haptic delivery cluster, according to an embodiment here.

FIG. 3 illustrates an embodiment in which the haptic delivery node 110-1 may be formed from a substrate 111-1, such as a sheet of silicon material or plastic material (e.g., Kapton®). In an embodiment, the substrate 111-1 may include dielectric material. In an embodiment, the sheet of material forming the substrate 111-1 may have a thickness (e.g., $d_3$) that is in a range of, e.g., 1 µm to 1 mm. In an embodiment, the various components of the haptic delivery node 110-1, such as the wireless communication interface 112-1 and energy storage device 114-1, may be disposed on or embedded in the substrate 111-1. In the embodiment of FIG. 3, the substrate 111-1 may be rectangular in shape, with a dimension $d_1$ (e.g., length) and $d_2$ (e.g., width). The two dimensions $d_1$, $d_2$ may be the same, or may differ. As discussed above, one or both of the dimensions $d_1$, $d_2$ may be on the scale of millimeters, microns, or even nanometers. For instance, one or both of the dimensions $d_1$, $d_2$ may be equal to or less than 5 mm, 1 mm, 100 µm, 10 µm, or 1 µm. In an embodiment, all dimensions (e.g., $d_1$, $d_2$, $d_3$) of the haptic delivery node 110-1 may be equal to or less than 5 mm, 1 mm, 100 µm, 10 µm, or 1 µm. In other embodiments, the substrate 111-1 may have a circular shape or some other shape different than a rectangular shape.

In an embodiment, at least some of the haptic delivery nodes 110-1 to 110-n may have control over their movement. For instance, some of the haptic delivery nodes 110-1 to 110-n may each form a MEMS structure, such as a MEMS rudder, that can rotate to control a direction of movement of the respective haptic delivery node through the air. The MEMS rudder may be controlled by a control signal from the haptic control unit 130, which may be received via a wireless communication interface 112-1. In another example, as discussed below in more detail, at least some of the haptic delivery nodes 110-1 to 110-n may include a chemical material disposed thereon for generating a chemical reaction that can propel those haptic delivery nodes in a particular direction.

Figures 5A, 5B:
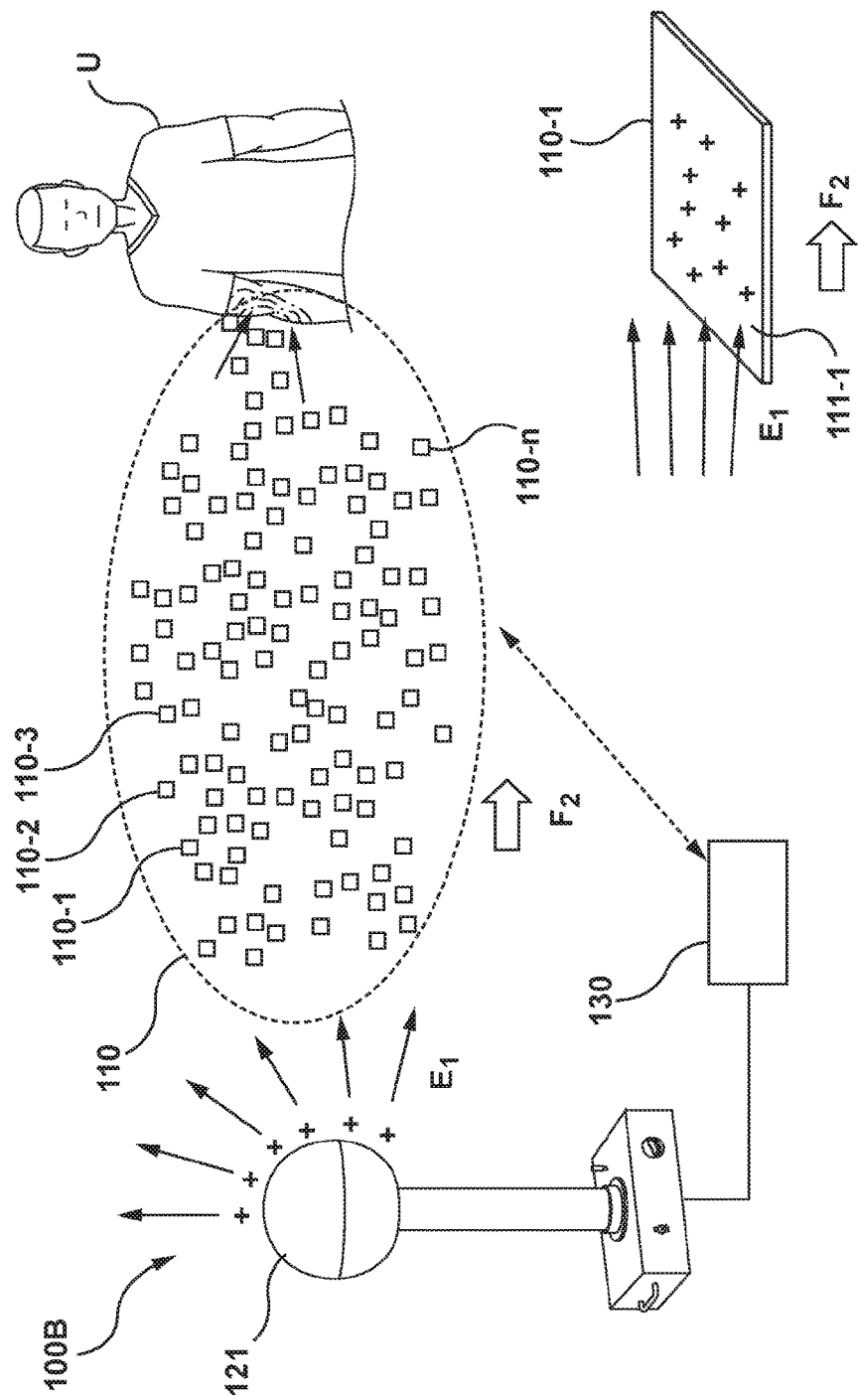
FIGS. 5A and 5B depict a system for providing a haptic effect with a haptic delivery cluster, in which the system includes electric field generator, according to an embodiment hereof.

FIGS. 4A and 4B illustrate a system 100A that includes an electric field generator 121 as the force generator. The electric field generator 121 is used to control movement of the plurality of haptic delivery nodes 110-1 to 110-n of the haptic delivery cluster 110. In an embodiment, the electric field generator 121 may be configured to generate an electric field that can exert a force on a charged object, e.g., a charged haptic delivery node, that is separated from the electric field generator by a distance, such as a distance in a range of, e.g., 10 cm to 10 m. In an embodiment, the electric field generator 121 may also be a charge generator, such as a Van de Graaf generator, that is configured to accumulate a net positive electrical charge or a net negative electric charge at a portion (e.g., spherical portion) of the charge generator. In an embodiment, the electric field generator 121 may be a high-voltage generator. In one implementation, the electric field generator 121 may generate a force that attracts the haptic delivery cluster 110 directly toward the electric field generator 121, as illustrated in FIGS. 4A and 4B. In another implementation, the electric field generator 121 may generate a force that repels the haptic delivery cluster 110 directly away from the electric field generator 121, as illustrated in FIGS. 5A and 5B and as described below.

In the embodiment of FIG. 4A, the electric field generator 121 is controlled by the haptic control unit 130, which may be configured to selectively activate and deactivate the electric field generator 121. The haptic control unit 130 may further be able to wirelessly communicate with the haptic delivery nodes 110-1 to 110-n. For instance, if the haptic delivery nodes 110-1 to 110-n each include a sensor component (e.g., 116-1) and a wireless communication interface (e.g., 112-1), the haptic control unit 130 may be configured to wirelessly receive sensor information generated by sensor components of the haptic delivery nodes 110-1 to 110-n.

In the embodiment of FIGS. 4A and 4B, the electric field generator 121 may be used to electrically polarize all or at least some of the haptic delivery nodes 110-1 to 110-n of the haptic delivery cluster 110. The polarization may create an electrostatic force $F_1$ that attracts the plurality of haptic delivery nodes 110-1 to 110-n toward the electric field generator 121. More specifically, as stated above, the electric field generator 121 may be a Van de Graaf generator configured to accumulate a net electric charge (e.g., a positive charge) at a spherical portion thereof. The net electric charge may generate an electric field $E_1$, as depicted in FIG. 4A. The electric field $E_1$ may polarize (i.e., electrically polarize) material (e.g., dielectric material) of one or more haptic delivery nodes (e.g., 110-1).

FIG. 4B depicts the electric field $E_1$ polarizing the substrate 111-1 of the haptic delivery node 110-1. The material of the substrate 111-1 that is polarized may be an insulating material, e.g., a dielectric material, or a conductive material. While the substrate 111-1 of the haptic delivery node 110-1 in FIG. 4B may be overall electrically neutral, the polarization from the electric field $E_1$ may cause negative charge in the substrate 111-1 to be slightly closer to the positive charge accumulated on the electric field generator 121, such that the positive charge in the substrate 111-1 is slightly farther away from the positive charge on the electric field generator. As a result, the force of attraction between the negative charge in the substrate 111-1 and the positive charge on the electric field generator 121 may be greater than the repelling force between the positive charge in the substrate 111-1 and the positive charge on the electric field generator 121, thus resulting in a net force $F_1$ on the haptic delivery node 110-1 that attracts or pulls the haptic delivery node 110-1 directly toward the electric field generator 121.

In the embodiment of FIGS. 4A and 4B, the haptic control unit 130 may be configured to activate the electric field generator 121 to attract the plurality of haptic delivery nodes 110-1 to 110-n of the haptic delivery cluster 110 toward the electric field generator 121. In an embodiment, the haptic control unit 130 may be configured to activate the electric field generator 121 only in response to determining that user presence, i.e., presence of a user, if any, is located along a path of movement of the haptic delivery cluster 110. For instance, the haptic control unit 130 in the system 100A of FIG. 4A may be configured to activate the electric field generator 121 only in response to determining that a location of a detected user presence is between the electric field generator 121 and the haptic delivery cluster 110. In such a situation, because the user is along the path of movement of the haptic deliver cluster 110, at least some of the haptic delivery nodes 110-1 to 110-n may collide with the user (e.g., the user's face, hand, or neck), wherein respective impacts from those collisions cumulatively deliver a haptic effect. The location of the user presence may be determined with one or more of the haptic delivery nodes 110-1 to 110-n, or with a sensor that is separate from the haptic delivery nodes 110-1 to 1100-n, as discussed in more detail below.

In the embodiment of FIGS. 4A and 4B, some or all of the haptic delivery nodes 110-1 to 110-n of the haptic delivery cluster 110 may be overall electrically neutral. In another embodiment, as depicted in FIGS. 5A and 5B, some or all of the haptic delivery nodes 110-1 to 110-n may have a net electric charge, and the electric field generator 121 may be configured to accumulate a net electric charge of the same polarity at a portion thereof. More specifically, FIGS. 5A and 5B illustrate a system 100B that includes a haptic delivery cluster 110 that includes one or more haptic delivery nodes, such as haptic delivery 110-1, that have a net positive charge, e.g., an ionic charge.

In some situations, the net positive charge may have been implanted or otherwise transferred to the one or more haptic delivery nodes during manufacturing of the one or more haptic delivery nodes. For instance, the substrate 111-1 of the haptic delivery node 110-1 may be formed from or include toner powder or other electronic ink material (e.g., particles formed from styrene acrylate copolymer), onto which a positive charge is transferred during manufacturing of the haptic delivery node 110-1. In another example, the substrate 111-1 may be embedded with positive charge via corona discharge during manufacturing of the haptic delivery node 110-1. In other situations, the net positive charge may be transferred to the one or more haptic delivery nodes after they have been manufactured and deployed in a physical environment, as discussed in more detail below.

In FIG. 5A, the system 100B includes the electric field generator 121, which may be configured to accumulate a net positive charge at portion thereof and to generate an electric field $E_1$. As depicted with respect to FIG. 5B, the field $E_1$ may generate a force $F_2$ that repels the net positive charge on the substrate 111-1 away from the electric field generator 121. In other words, the positive charge that is accumulated on a portion of the electric field generator 121 may repel the net positive charge on the substrate 111-1 of the haptic delivery node 110-1, thus producing a force $F_2$ that is in a direction pointing directly away from the electric field generator 121 such that the haptic delivery node 110-1 is pushed away from the generator.

Similar to the embodiment of FIGS. 4A and 4B, the haptic control unit of FIGS. 5A and 5B may be configured to activate the electric field generator 121 to repel or push the haptic delivery cluster 110 away from the electric field generator 121. In an embodiment, the haptic control unit 130 may be configured to activate the electric field generator 121 only in response to determining that user presence, if any, is in a path of movement of the haptic delivery cluster 110. For instance, the haptic control unit 130 in the system 100B of FIG. 5A may be configured to activate the electric field generator 121 only in response to determining that the haptic delivery cluster 110 is located between the electric field generator 121 and a location of a user U, such that the user U will be in the path of movement of the haptic delivery cluster 110. By being in the path of movement of the haptic delivery cluster 110, the user U may experience collision from at least some of the haptic delivery nodes 110-1 to 110-n, as illustrated in FIG. 5A. As discussed above, a haptic effect is generated from the respective impacts of at least some of the haptic delivery nodes 110-1 to 110-n.

In an embodiment, the haptic effect may further be generated from electrostatic discharge of the net electric charge on the haptic delivery nodes 110-1 to 110-n onto a body part of the user U. For instance, at least some of the haptic delivery nodes 110-1 to 110-n may collide with a user's hand, upon which net electric charge (e.g., net positive charge) on the colliding haptic delivery nodes may be discharged onto the user's hand. The user may perceive the electrical discharge as, e.g., a static shock or other tactile sensation. In such an embodiment, the static shock may be used to generate the haptic effect.

In an embodiment, after some of the haptic delivery nodes 110-1 to 110-n collide with the user those haptic delivery nodes may lose any electrical charge and fall to the floor, where the haptic delivery nodes can be collected and reused or otherwise disposed. In an embodiment, the control unit 130 may control the electric field generator 121 and/or other force generator to generate a net force on the haptic delivery nodes 110-1 to 110-n that steer them toward a specific body part, or away from a specific body part. For instance, the haptic delivery nodes 110-1 to 110-n may be steered away from the user U's head, so as to lower the risk of inhalation of any of the haptic delivery nodes 110-1 to 110-n. The control unit 130 may include or be in communication with a camera that is configured to capture an image of the physical environment, and the control unit 130 may be configured to identify from the image a location of the haptic delivery nodes 110-1 to 110-n relative to the specific body part, such as the user U's head. In an embodiment, the haptic delivery nodes 110-1 to 110-n may be formed from only non-toxic materials, so as to minimize the effects of inhalation of any of the haptic delivery nodes 110-1 to 110-n. In another example, the haptic delivery nodes 110-1 to 110-n may be steered toward a user's hand. For instance, the haptic delivery nodes 110-1 to 110-n may represent virtual objects in a VR or AR environment, such as virtual blades of grass or virtual petals of a flower. When the user's hand is reaching for the virtual objects, the haptic delivery nodes 110-1 to 110-n may be directed to the user's hand to deliver a haptic effect.

Figure 5C:
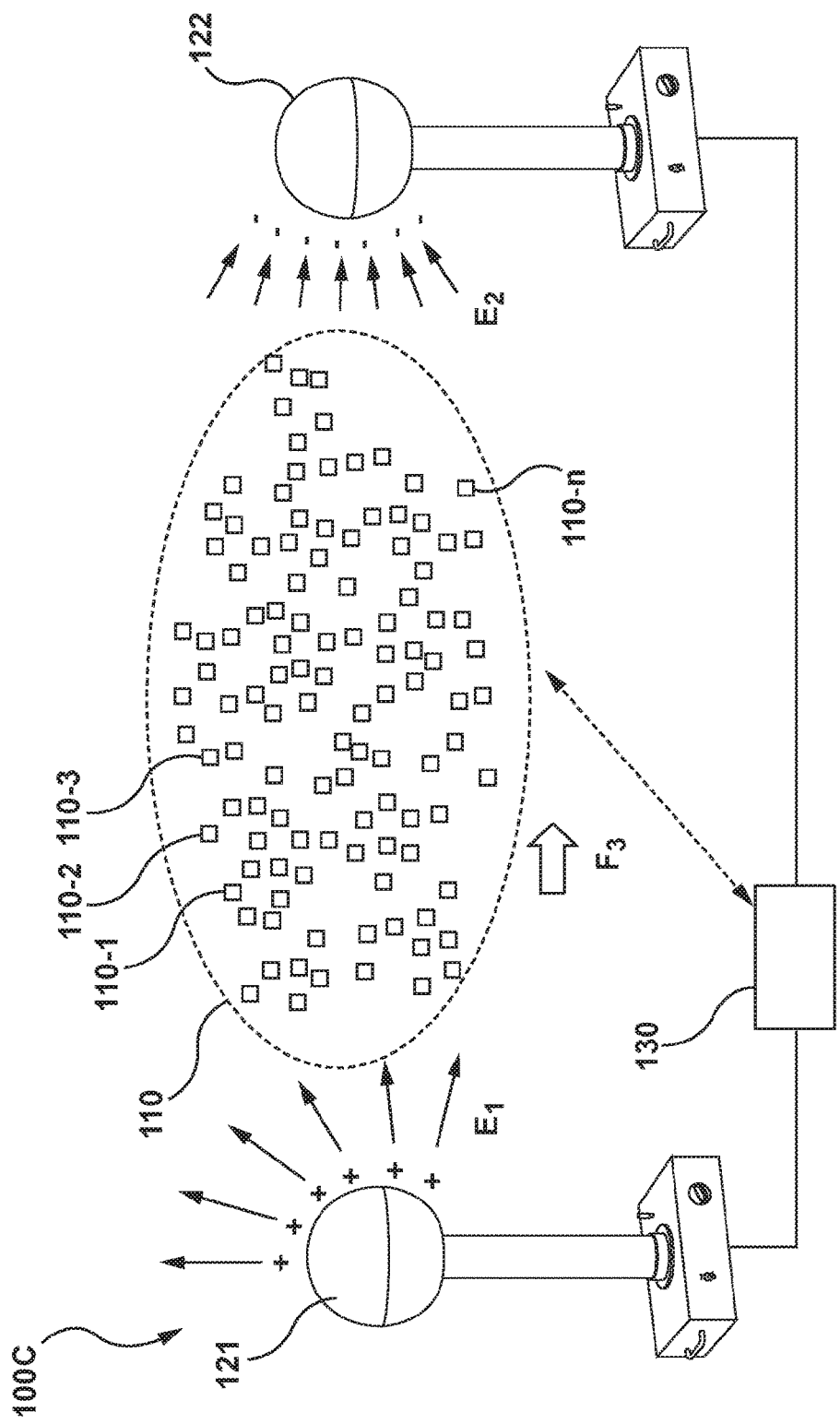
FIG. 5C depicts a system for providing a haptic effect with a haptic delivery cluster, in which the system includes a first electric field generator and a second electric field generator, according to an embodiment hereof.

While FIGS. 5A and 5B illustrate a system 100B having a single electric field generator 121, some other embodiments may involve a system having more electric field generators or, more generally, multiple force generators. For instance, FIG. 5C illustrates a system 100C that includes the electric field generator 121, which may be referred to as a first electric field generator, the haptic control unit 130, and the haptic delivery cluster 110 of FIGS. 5A and 5B, and further includes another electric field generator 122, e.g., which may be referred to as a second electric field generator, in communication with the haptic control unit 130. Similar to the embodiments of FIGS. 5A and 5B, some or all of the haptic delivery nodes 110-1 to 110-n of the haptic delivery cluster 110 may nave a net positive charge, which may be repelled by the positive charge accumulated on the electric field generator 121. In FIG. 5C, the second electric field generator 122 may be, e.g., a Van de Graaf generator, that is configured, when activated, to accumulate a net negative charge, which is opposite in polarity to the net positive charge on some or all of the haptic delivery nodes 110-1 to 110-n. The net negative charge may generate an electric field $E_2$ that is directed toward the second electric field generator 122, while the electric field $E_1$ is directed away from the first electric field generator 121. Thus, the haptic control unit 130 may be configured to activate the second electric field generator 122 to attract the haptic delivery nodes 110-1 to 110-n of the haptic delivery cluster 110 toward the second electric field generator 122. As illustrated in FIG. 5C, the repelling force produced by the first electric field generator 121 on the haptic delivery nodes 110-1 to 110-n of the haptic delivery cluster 110, and the attractive force produced by the second electric field generator 122 of those haptic delivery nodes 110-1 to 110-n may produce a net or cumulative force $F_3$ that is in a direction from the first electric field generator 121 toward the second electric field generator 122. In an embodiment, the first electric field generator 121 and the second electric field generator 122 may cause the haptic delivery cluster 110 to move back and forth between the two electric field generators, such as by periodically and synchronously reversing the polarity of the charge accumulated on the respective electric field generators.

As stated above, in some instances the net electric charge (e.g., net positive charge) on some or all of the haptic delivery nodes 110-1 to 110-n of the haptic delivery cluster 110 may be transferred to those haptic delivery nodes after they have been manufactured and deployed in a physical environment. For instance, FIGS. 6A and 6B illustrate an embodiment in which the electric field generator 121 is used to transfer electric charge to some of the haptic delivery nodes 110-1 to 110-n. More specifically, the electric field generator 121 may be configured to accumulate net positive charge on a portion (e.g., spherical portion) thereof, and some of the positive charge may be transferred to some of the haptic delivery nodes 110-1 to 110-n when those haptic delivery nodes come into contact with the electric field generator 121. For instance, FIG. 6B illustrates the haptic delivery node 110-1 corning into contact with the electric field generator 121. In some cases, the haptic delivery node 110-1 may have been attracted toward the electric field generator, like in the situation depicted in FIGS. 4A and 4B, so that the haptic delivery node 110-1 comes into contact with the electric field generator 121. Referring again to FIG. 6B, when the haptic delivery node 110-1 comes into contact with the electric field generator 110-1, positive charge from the electric field generator 121 may be transferred to the substrate 111-1 of the haptic delivery node 110-1. In an embodiment, after the positive charge is transferred to the haptic delivery node 110-1, the electric field generator 121 may repel the haptic delivery node 110-1 because they both have a net positive charge. In an embodiment, after positive charge has been transferred to the haptic delivery node 110-1, the haptic delivery node 110-1, as well as other haptic delivery nodes of the haptic delivery cluster 110, may be used in the system 100B of FIGS. 5A and 5B or the system 100C of FIG. 5C, which involve haptic delivery nodes (e.g., 110-1) that have a net electric charge. The embodiment of FIGS. 6A and 6B may allow haptic delivery nodes 110-1 to 110-n of the haptic delivery cluster 110 to go through a cycle in which the haptic delivery nodes 110-1 to 110-n gain a net electric charge, generate a haptic effect via electrostatic discharge in watch the net electric charge is lost, and to then gain the net electric charge again.

Figure 7B:
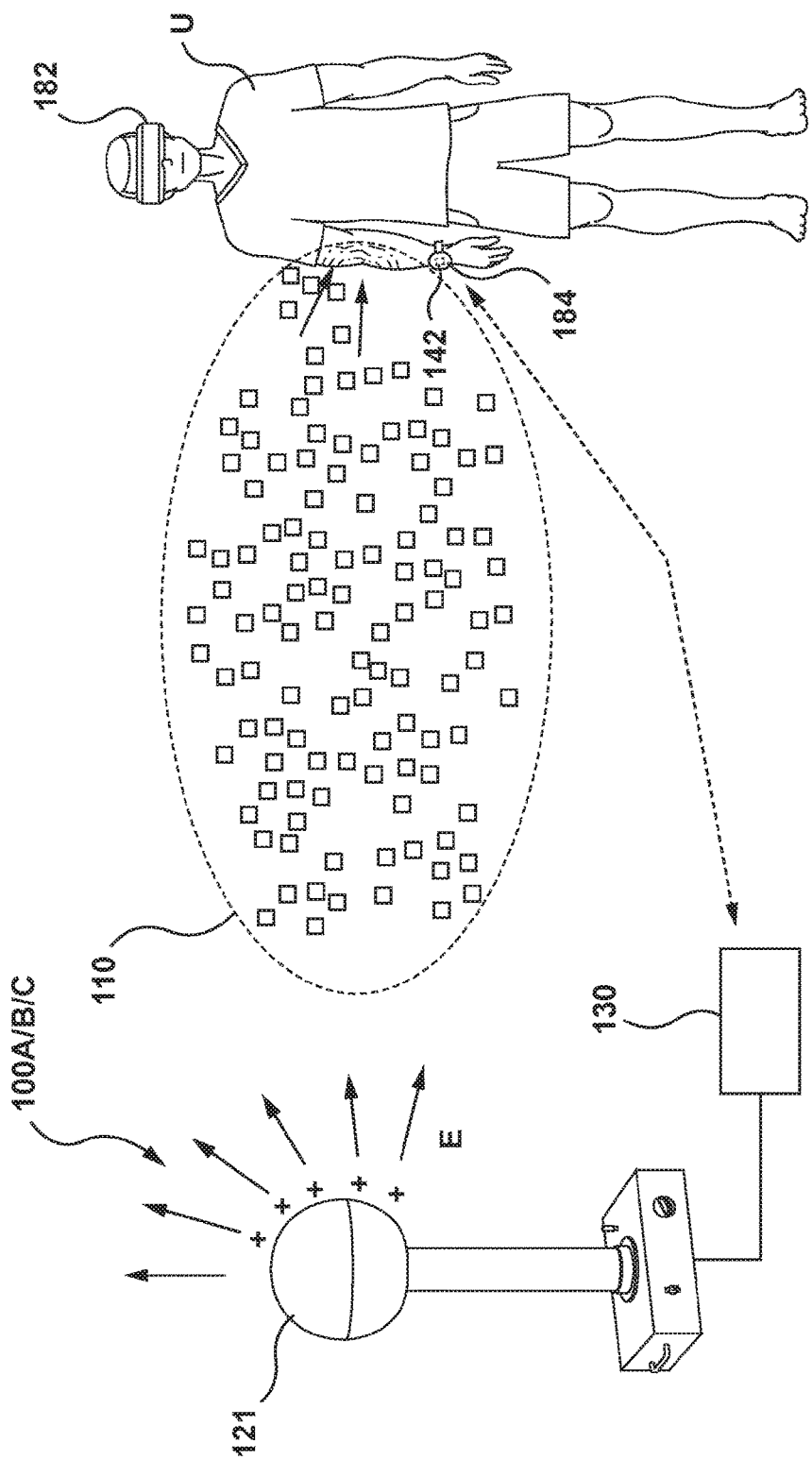
FIG. 7B illustrates a system for providing a haptic effect with a haptic delivery cluster, in which the system includes a sensor for tracking user location, according to an embodiment hereof.

In an embodiment, as discussed above, one or more of the haptic delivery nodes 110-1 to 110-n may include a sensor (e.g., a proximity sensor) configured to detect user presence. In an embodiment, a sensor that is separate front the haptic delivery nodes 110-1 to 110-n may be used to detect user presence. For instance, FIG. 7A illustrates a proximity sensor 140 that is used by the haptic control unit 130 to detect user presence, while FIG. 7B illustrates a location sensor 142 that is used by the haptic control unit 130 to detect user preference. Both the proximity sensor 140 and the location sensor 142 may be part of a user tracking sub system that is used within the system 100A, 100B, or 100C to detect user presence in a physical environment. The haptic control unit 130 may be configured to activate the electric field generator 121 only in response to a detection of user presence.

In the embodiment of FIG. 7A, the proximity sensor 140 may be, e.g., a capacitive or photoelectric proximity sensor. The proximity sensor 140 may be configured to detect an object (e.g., a user) being within a defined threshold distance (e.g., 20 cm, 50 cm) from the proximity sensor 140. The proximity sensor 140 may be placed at a location within a physical environment where user presence is expected (e.g., center of a living room). While FIG. 7A depicts a single proximity sensor, other embodiments may include additional proximity sensors placed at various other locations within the physical environment.

In the embodiment or FIG. 7B, the location sensor 142 may be a sensor that is attached to (e.g., worn by) a user or carried by a user U. For instance, the location sensor 142 may be a global positioning system (GPS) sensor that is part of a wearable device 184, such as an electronic watch. In another example, the location sensor 142 may be part of another wearable device 182, such as a head-mounted device (HMD). In another embodiment, the location sensor 142 may be part of a mobile phone, handheld controller, or tablet computer carried by the user U.

In an embodiment, the location sensor 142 may be configured to identify a location of the user U, and to wirelessly communicate the location to the haptic control unit 130. Based on information communicated by the location sensor 142, the haptic control unit 130 may be configured to determine whether the user U is in a physical environment in which the haptic delivery cluster 110 is deployed. In another embodiment, the system 100A/100B/100C may include a tracking sub-system having a camera configured to capture an image of the physical environment in which the haptic delivery cluster 110 is deployed. The haptic control unit 130 may be configured to process the image to detect presence of a user U, or may be in communication with an image processing computer that is configured to process the image and identify presence of a user U.

In an embodiment, the haptic control unit 130 may be configured to use the haptic delivery nodes 110-1 to 110-n, the proximity sensor 140, and/or the location sensor 142 to determine a location of a specific body part (e.g., head, neck, hand) of a user. In such an embodiment, the haptic control unit 130 may be configured to determine whether the specific body part of the user will be in a path of movement of the haptic delivery cluster 110, and may be configured to activate the electric field generator 121/122 or other force generator only in response to a determination that the specific body part of the user is in the path of movement of the haptic delivery cluster 110.

Figure 8:
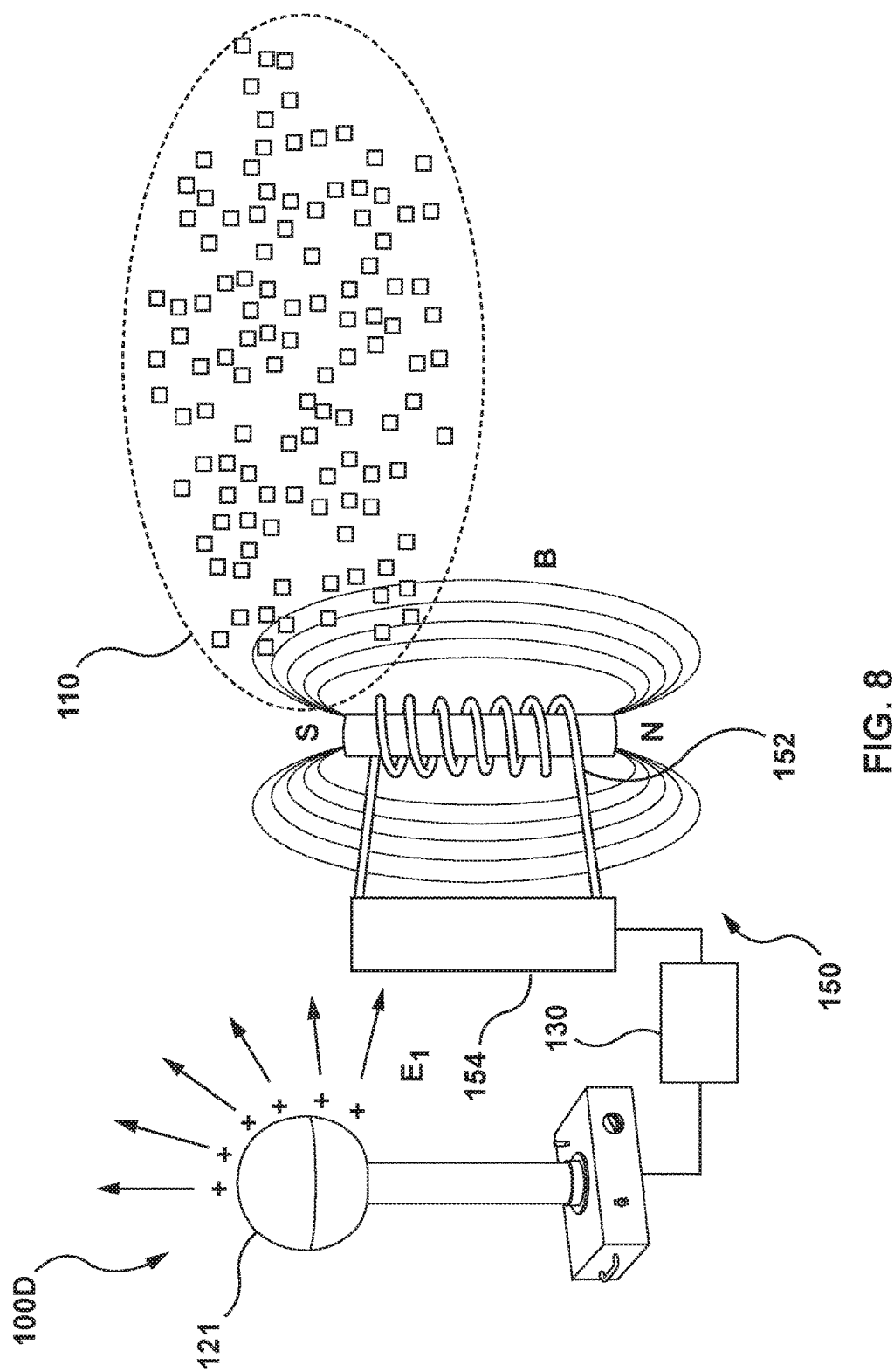
FIG. 8 illustrates a system for providing a haptic effect with a haptic delivery cluster, in which the system includes a magnetic field generator, according to an embodiment hereof.

As stated above, a force generator (e.g., 120) of the embodiments herein may include a magnetic field generator, either alone or in combination with an electric field generator, pneumatic actuator, or other device. For instance, FIG. 8 illustrates a system 100D that includes both an electric field generator 121 and a magnetic field generator 150. The system 100D may further include the haptic delivery cluster 110 and the haptic control unit 130, which is in communication with both the electric field generator 121 and the magnetic field generator 150. In an embodiment, the magnetic field generator 150 may include a current source 154 and a conductive coil 152. When the current source 154 passes an electrical current through the conductive coil 152, the coil 152 may generate a magnetic field B.

In an embodiment, the haptic delivery nodes (e.g., 110-1 to 110-n) of the haptic delivery cluster 110 of FIG. 8 may have a net electric charge and/or a net magnetic dipole. For instance, each of the haptic delivery nodes of the haptic delivery cluster 110 may include a metal powder or other ferromagnetic material that has been magnetized during or after manufacture. In an embodiment, the electric field generator 121 may generate an electric field $E_1$ that produces an electrostatic force on the haptic delivery nodes of the haptic delivery cluster 110. The electrostatic force may be in a direction that directly approaches the electric field generator 121 or directly away from the electric field generator 121. In an embodiment, when the magnetic field B is generated by the magnetic field generator 150, the magnetic field B may generate a force of attraction or repulsion on the net magnetic dipole (if any) of the haptic delivery nodes of the haptic delivery cluster 110, and/or generate a Lorentz force on a net electric charge (if any) of the haptic delivery nodes of the haptic delivery cluster if the haptic delivery nodes are moving. The Lorentz force may be in a direction that is perpendicular to both a direction of magnetic field lines of the magnetic field B and to a direction of movement of the haptic delivery nodes. The magnitude of the Lorentz force may be proportional to an amount of net electric charge on each of the haptic delivery nodes and their speed, as well as a strength of the magnetic field B. In some instances, the Lorentz force may cause the haptic delivery nodes to follow a circular path in a plane that is perpendicular to the magnetic field lines of the magnetic field B (e.g., revolve around magnetic field lines of the magnetic field B). In an embodiment, the haptic control unit 130 may be configured to use the electric field generator 121 and the magnetic field generator 150 to steer the haptic delivery nodes of the haptic delivery cluster 110. For instance, the haptic control unit 130 may cause the haptic delivery nodes of the haptic delivery cluster 110 to move along electric field lines of the electric field $E_1$, and to cause those haptic delivery nodes to revolve around magnetic field lines of the magnetic field B. The haptic control unit 130 may be configured to activate the magnetic field generator 150 and the electric field generator 121 simultaneously, or to activate them sequentially, e.g., activate the magnetic field generator 150 after the electric field generator 121 has been activated.

Figure 9:
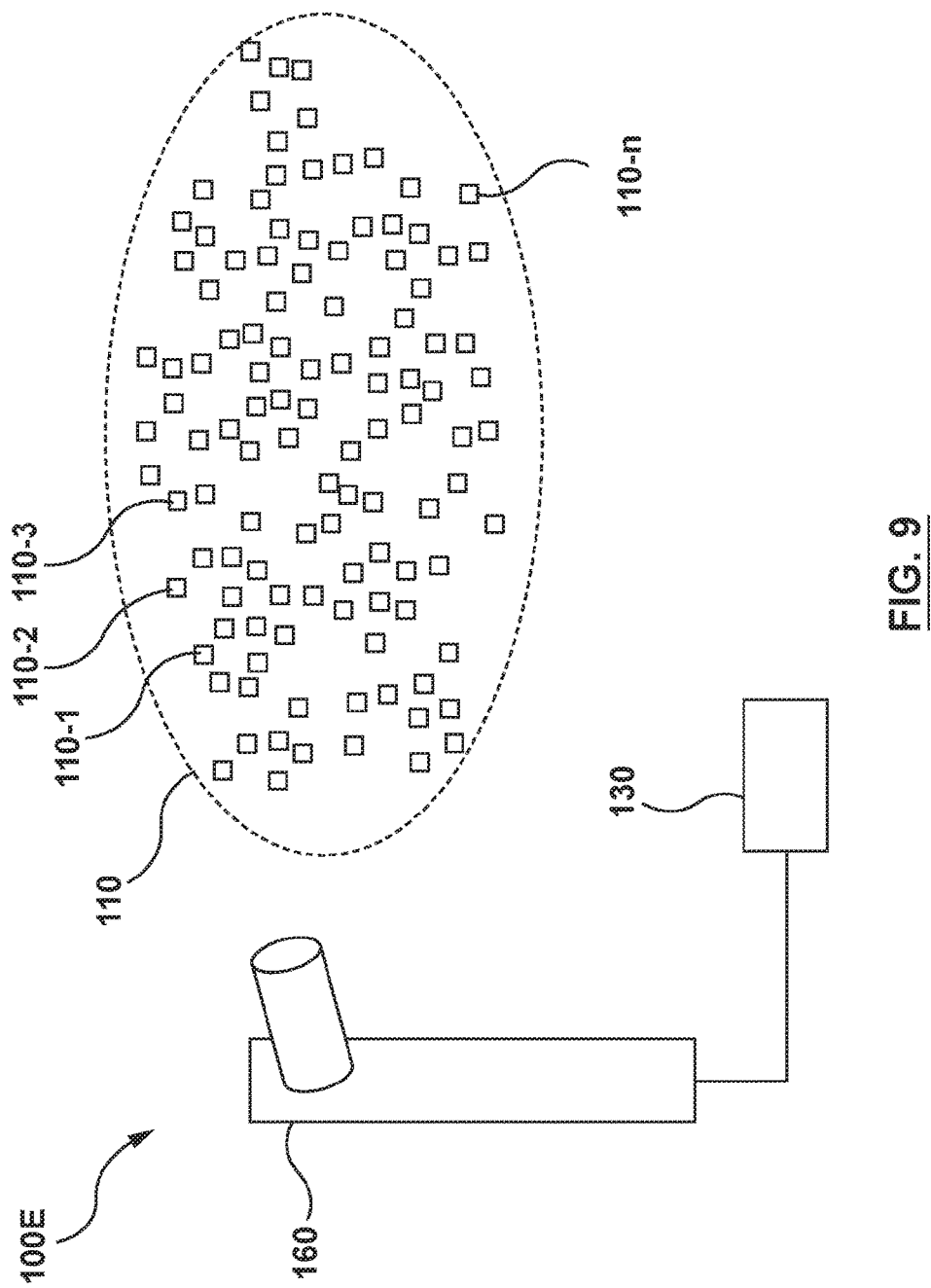
FIG. 9 illustrates a system for providing a haptic effect with a haptic delivery cluster, in which the system includes a pneumatic actuator, according to an embodiment hereof.

As stated above, the force generator of embodiments described herein (e.g., 120) may include a pneumatic actuator, alone or in combination with an electric field generator and/or a magnetic field generator. For instance, FIG. 9 depicts a system 100E that includes a pneumatic actuator 160, a haptic control unit 130 in communication with the pneumatic actuator 160, and the haptic delivery nodes 110-1 to 110-n of the haptic delivery cluster 110. In some instances, haptic control unit 130 may be configured to wirelessly communicate with at least some haptic delivery nodes of the plurality of haptic delivery nodes 110-1 to 110-n.

In an embodiment, the pneumatic actuator 160 may be configured to propel the haptic delivery nodes 110-1 to 110-n away from the pneumatic actuator 160 (e.g., via a pulse of air) or toward the pneumatic actuator 160 (e.g., via suction). In an embodiment, the pneumatic actuator 160 may include an ultrasound device configured to emit ultrasound pulses toward the haptic delivery nodes 110-1 to 110-n of the haptic delivery cluster 110. In an embodiment, the pneumatic actuator 160 may include an air compressor or a fan configured to direct air toward the haptic delivery nodes 110-1 to 110-n to push them away from pneumatic actuator 160. In an embodiment, the pneumatic actuator may include a vacuum configured to create a region of low pressure that draws or pulls the haptic delivery nodes 110-1 to 110-n toward the pneumatic actuator 160.

In an embodiment, the pneumatic actuator 160 may be used in combination with the electric filed generator 121/122 and/or the magnetic field generator 150. In an embodiment, the pneumatic actuator 160 may be used alone, without the electric field generator 121/122 or magnetic field generator 150. Further, while some of the above embodiments illustrate a force generator having a single pneumatic actuator, magnetic field generator, or electric field generator, various embodiments herein may use a force generator having a plurality of pneumatic actuators, a plurality of magnetic field actuators, and/or a plurality of electric field generators, which may be disposed at a plurality of different respective locations in a physical environment.

Figure 10A:
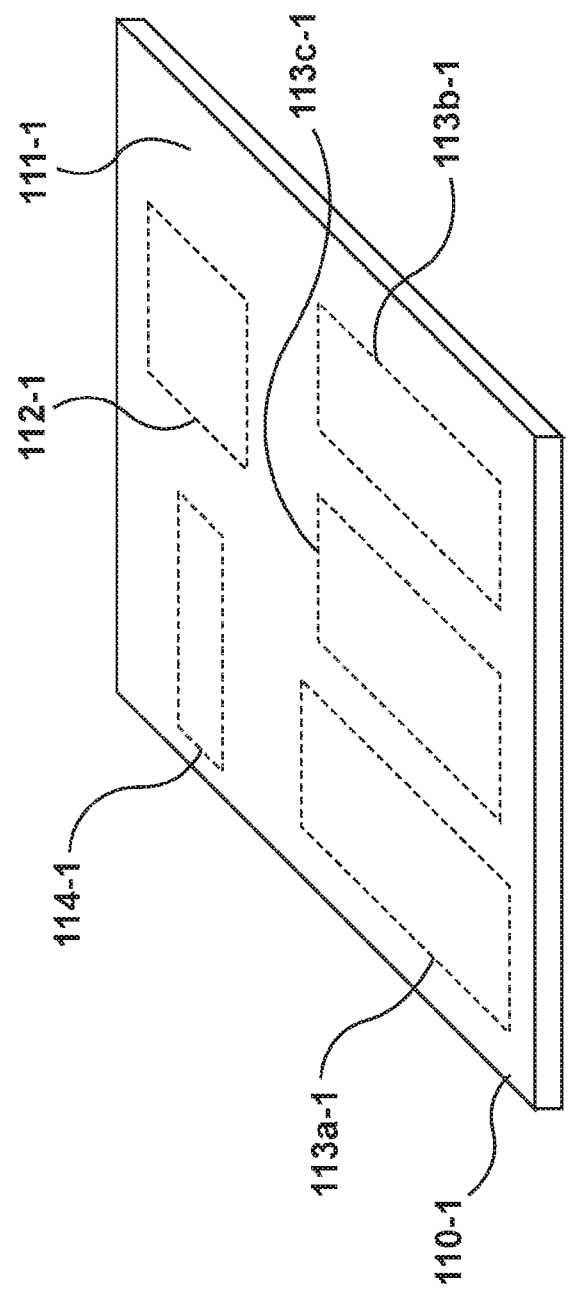
FIGS. 10A and 10B illustrate a system for providing a haptic effect with a haptic delivery cluster, in which at least some haptic delivery nodes of the haptic delivery cluster include material that can generate a chemical reaction, according to an embodiment hereof.
Figure 10B:
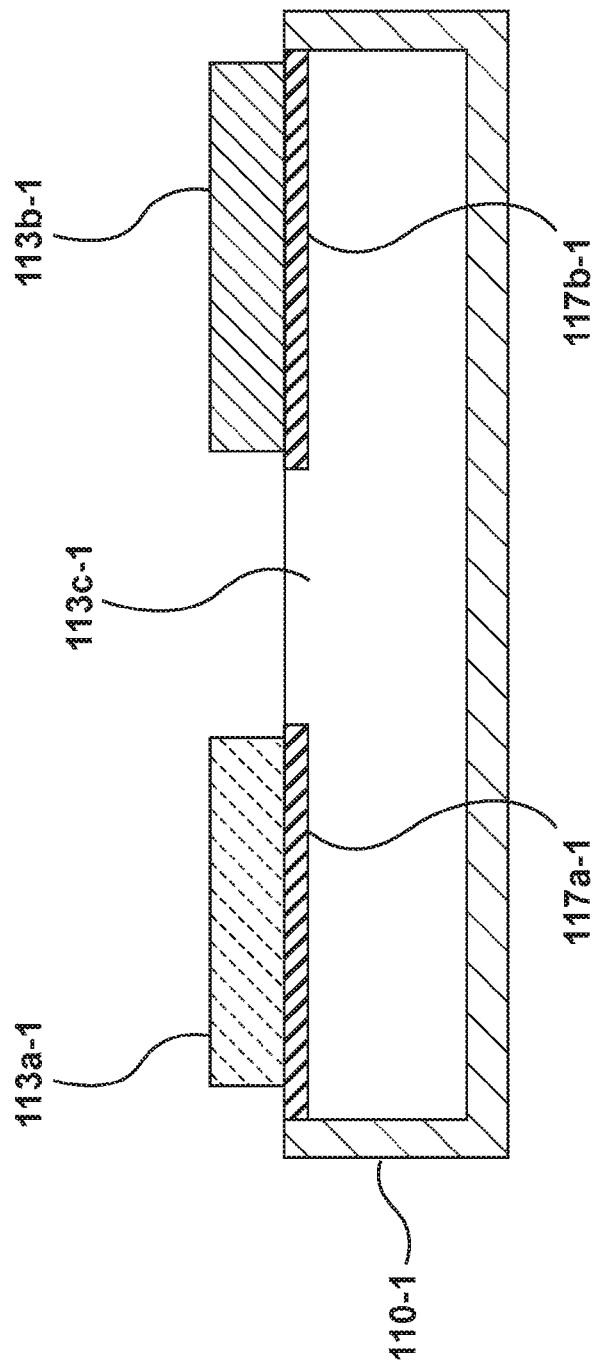

In an embodiment, as discussed above, at least some of the haptic delivery nodes 110-1 to 110-n may be configured to generate a haptic effect via a chemical reaction. For instance, FIGS. 10A and 10B depict an embodiment of a haptic delivery node 110-1 of the haptic delivery cluster 110 that includes a compartment 113a-1 and a compartment 113b-1 that store pyrotechnic material. The pyrotechnic material may be mixed in a compartment 113c-1 to generate a chemical reaction. The chemical reaction may be, e.g., an exothermic reaction or an endothermic reaction. In an embodiment, heat or coolness resulting from the chemical reaction may be perceived by the user as a tactile sensation. In an embodiment, pressure (e.g., a pressure wave) from the chemical reaction may be perceived by the user as a tactile sensation. In other words, release of thermal energy by the chemical reaction, absorption of thermal energy by the chemical reaction, or pressure from the chemical reaction may be used to generate the haptic effect.

In an embodiment, the chemical reaction within the haptic delivery node 110-1 may also be used to propel the haptic delivery node 110-1 toward the user, so as to collide with the user. The impact from the collision, in addition or instead of the heat/coolness or pressure of the chemical reaction, may be relied upon to deliver a haptic effect. In some instances, the use of the chemical reaction to propel the haptic delivery node 110-1, as well as other haptic delivery nodes of the haptic delivery cluster 110, may allow omission of a force generator (e.g., 120).

In FIG. 10A, the haptic delivery node 110-1 may include a wireless communication interface 112-1, an energy storage device 114-1, a first compartment 113a-1 for storing a first pyrotechnic material, a second compartment 113b-1 for storing a second pyrotechnic material, and a mixing compartment 113c-1 for mixing the first pyrotechnic material and the second pyrotechnic material. In an embodiment, the first pyrotechnic material is an oxidizer, such as potassium nitrate, potassium chlorate, or potassium perchlorate, and the second pyrotechnic material comprises fuel, such as charcoal powder, aluminum powder, phosphorus powder, or silver fulminate. In an embodiment, any of the above materials may be stored in only a small quantity (e.g., less than 1 mg, or less than 100 μg). In an embodiment, the energy storage device 114-1 may provide energy to start the chemical reaction.

FIG. 10B illustrates a sectional view of the first compartment 113a-1 and the second compartment 113b-1. In an embodiment, material in the first compartment 113a-1 may be separated from the mixing compartment 113c-1 by a first MEMS gate 117a-1 (e.g., a first piezoelectric gate), while material in the second compartment 113b-1 may be separated from the mixing compartment 113c-1 by a second MEMS gate 117b-1 (e.g., a second piezoelectric gate). In an embodiment, the first MEMS gate 117a-1 and the second MEMS gate 117b-1 may be configured to be opened in response to a command signal from the haptic control unit 130, which may be received via the wireless communication interface 112-1.

In an embodiment, the haptic delivery node 110-1 may still be light enough to be able to float in the air. In another embodiment, the pyrotechnic material may render the haptic delivery node 110-1 too heavy to float in the air. In such an embodiment, the haptic delivery node 110-1, along with other haptic delivery nodes of the haptic delivery cluster 110, may be physically deployed on a surface (e.g., tabletop, floor) of a physical environment. When a user is in proximity to the surface, the haptic control unit 130 may communicate a command signal to the haptic delivery nodes (e.g., 110-1) to cause the nodes to generate the chemical reaction so as to deliver a haptic effect.

Figure 11:
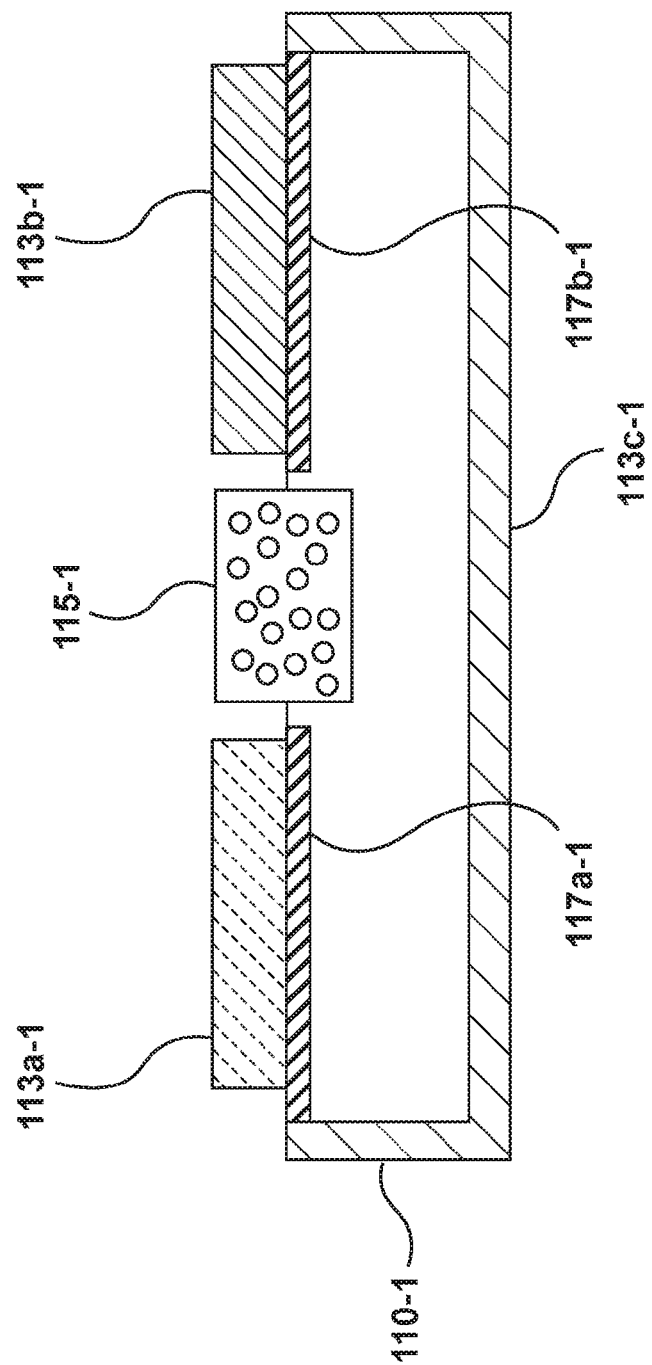
FIG. 11 illustrates a system for providing a haptic effect with a haptic delivery cluster, in which at least some haptic delivery nodes of the haptic delivers cluster include material that can generate a chemical reaction, according to an embodiment hereof.

FIG. 11 depicts another embodiment in which a haptic delivery node 110-1 includes a compartment 115-1 that stores particles, e.g., beads, that can be propelled by the chemical reaction of the pyrotechnic material of the haptic delivery node 110-1. For instance, the compartment 115-1 may store beads that are each in a range of 1 μm to 100 μm in size. The particles/beads may be propelled by the heat and/or pressure of the chemical reaction of the pyrotechnic material to collide with a user to generate a haptic effect.

Figure 12:
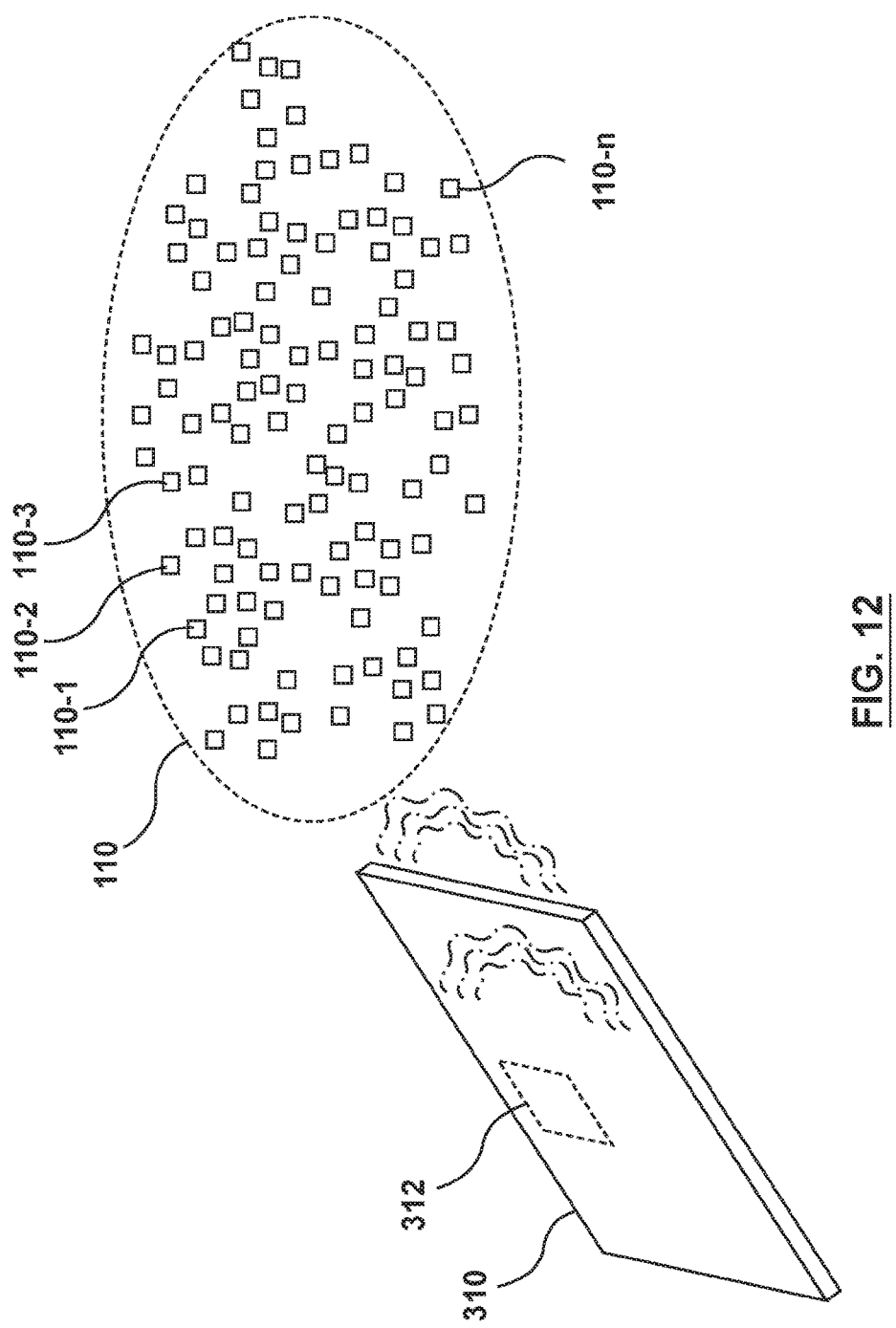
FIG. 12 illustrates a system that includes haptic delivery cluster and a mobile device having a vibrotactile actuator, according to an embodiment hereof.

As discussed above, the haptic delivery node 110-1 may in an embodiment include an energy harvesting device 118-1 for extracting energy from the physical environment to operate the haptic delivery node 110-1. FIG. 12 depicts an embodiment in which the haptic delivery nodes 110-1 to 110-n include respective energy harvesting devices 118-1 (not shown) that may be configured to extract energy from vibration on a user interface device 310, such as a mobile phone or tablet computer. In an embodiment, the user interface device 310 may include a vibrotactile actuator 312, e.g., eccentric rotating mass (ERM) actuator, configured to generate a vibrotactile haptic effect on a surface of the user interface device 310. In an embodiment, the haptic delivery nodes 110-1 to 110-n may be placed in contact with the user interface device 310. The vibration may output mechanical energy, and the energy harvesting device 118-1 (e.g., piezoelectric transducer) may be configured to convert the mechanical energy into electric energy, which may be immediately used or may be stored in an energy storage device 114-1, if included. In an embodiment, the vibration may be used to awaken at least some of the haptic delivery nodes 110-1 to 110-n from a hibernating state. When awakened, the haptic delivery nodes 110-1 to 110-n may, in an embodiment, be configured to wirelessly communicate information (e.g., sensor information) to the user interface device 310.

In an embodiment, the haptic delivery cluster 110 may be used to activate or otherwise complement haptic output devices that are attached to the user U's body. For instance, the haptic delivery cluster 110 may in an embodiment be used to electrically close (also referred to as electrically complete) an electrical circuit used for a haptic output device attached to or otherwise mounted on the user U's body. More specifically, the haptic output device, e.g., a vibrotactile actuator such as a linear resonant actuator, may have an electrode pattern from a power source, e.g., a battery, to an actuatable component, and the electrode pattern may have one or more gaps in which there is no conductive material. The electrode pattern may be, e.g., part of a wiring pattern that is also attached to the user U's body. The one or more gaps may cause there to be an open electrical circuit between the power source and the actuatable component, and thus may prevent an electrical current from flowing from the power source to the actuatable component. In an embodiment, the haptic delivery cluster 110, e.g., smart dust, may be used to close, i.e., complete, the electrical circuit between the power source and the actuatable component, thus allowing electrical current to flow from the power source to the actuatable component to generate a haptic effect. For instance, the haptic delivery nodes 110-1 to 110-n may be formed from conductive material. When the haptic delivery nodes 110-1 to 110-n collide with the electrode pattern attached to the user U's body, some of the haptic deliver nodes 110-1 to 110-n may cover the one or more gaps. The conductive material of those haptic delivery nodes may then complete the electrical circuit from the power source to the actuatable component, thus allowing electrical current to flow to the actuatable component to generate a haptic effect. In an embodiment, the power supply can be an embedded component of the haptic output device. In an embodiment, the electrode pattern may be in the form of a tattoo on a portion of a user U's body. In an embodiment, the actuating component may be wirelessly powered up. In an embodiment, the haptic output device may be part of a heating system to provide a haptic effect in the form of heating on the user's body.

In an embodiment, the haptic delivery nodes 110-1 to 110-n may be sprayed on a user's body U, or may be placed on a patch that is then attached to the user U's body. The haptic delivery nodes 110-1 to 110-n that are sprayed or placed via patches on the user U's body may be activated remotely, such as with light or pulses of air. For instance, light or air can interact with material of the haptic delivery nodes 110-1 to 110-n and create a tiny explosion or other chemical reaction to provide a haptic effect for the user U.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A method for providing haptic effects, comprising:
   detecting, by a haptic control unit, user presence in a physical environment in which a haptic delivery cluster is located, wherein the haptic delivery cluster comprises a plurality of haptic delivery nodes, wherein each haptic delivery node of the plurality of haptic delivery nodes: (a) is separate from other haptic delivery nodes of the plurality of haptic delivery nodes, and (b) is at least one of a wireless communication device, a sensor, or a computing device;
   determining, by the haptic control unit, a location at which the user presence is detected;
   activating, by the haptic control unit after the user presence is detected, an electric field generator in communication with the haptic control unit to cause the electric field generator to generate an electric field in the physical environment of the haptic delivery cluster and to cause movement of the plurality of haptic delivery nodes towards the location at which the user presence is detected.

2. The method of claim 1, wherein each haptic delivery node of the plurality of haptic delivery nodes has a dimension that is less than or equal to 5 mm.

3. The method of claim 2, wherein each haptic delivery node of the plurality of haptic delivery nodes has a dimension that is in a range of 100 um to 1 mm.

4. The method of claim 2, wherein a total number of the plurality of haptic delivery nodes in the haptic delivery cluster is in a range of 1,000 to 100,000 haptic delivery nodes.

5. The method of claim 1, further comprising determining, after the user presence is detected in the physical environment, whether to generate the haptic effect with the haptic delivery cluster, wherein the step of activating the electric field generator is in response to a determination to generate the haptic effect with the haptic delivery cluster.

6. The method of claim 1, wherein each haptic delivery node of the plurality of haptic delivery nodes includes: (a) a wireless communication interface configured to communicate with the haptic control unit; and (b) a sensor component configured to sense a parameter of the physical environment in which the haptic delivery cluster is located, the method further comprising:
   receiving, by the haptic control unit, sensor data indicative of the parameter of the physical environment from at least one haptic delivery node of the plurality of haptic delivery nodes.

7. The method of claim 1, wherein the step of activating the electric field generator is in response to a determination that the location at which the user presence is detected is between the electric field generator and the haptic delivery cluster,
   wherein each haptic delivery node of the plurality of haptic delivery nodes of the haptic delivery cluster is formed from a dielectric material that is configured to be electrically polarized by the electric field generated by the electric field generator,
   wherein the electric field generator is configured to accumulate a net electric charge that attracts the dielectric material of each haptic delivery node of the plurality of haptic delivery nodes, such that activation of the electric field generator causes movement of the plurality of haptic delivery nodes of the haptic delivery cluster toward the electric field generator.

8. The method of claim 1, wherein the step of activating the electric field generator is in response to a determination that the haptic delivery cluster is between the electric field generator and the location at which the user presence is detected,
   wherein each haptic delivery node of the plurality of haptic delivery nodes of the haptic delivery cluster has a net electric charge, and wherein the electric field generator is configured to accumulate a net electric charge having a same polarity as the net electric charge of each haptic delivery node, such that activation of the electric field generator causes movement of the plurality of haptic delivery nodes of the haptic delivery cluster away from the electric field generator.

9. The method of claim 8, wherein the electric field generator is a first electric field generator, and wherein the method further comprises:
   activating, by the haptic control unit, a second electric field generator that is configured to accumulate a net electric charge that is opposite in polarity to the net electric charge of each haptic delivery node of the plurality of haptic delivery nodes of the haptic delivery cluster, such that activation of the second electric field generator attracts the plurality of haptic delivery nodes of the haptic delivery cluster toward the second electric field generator.

10. The method of claim 1, wherein the haptic control unit is in communication with a magnetic field generator that is configured, when activated, to generate a magnetic field in the physical environment in which the haptic delivery cluster is located, and wherein the method further comprises:
    determining, by the haptic control unit, a path of movement of at least a subset of haptic delivery nodes of the haptic delivery cluster if the magnetic field generator is activated,
    determining, by the haptic control unit, if the location at which the user presence is detected is on the path of movement of at least the subset of haptic delivery nodes of the haptic delivery cluster, and
    activating the magnetic field generator by the haptic control unit in response to a determination that the location at which the user presence is detected is on the path of movement of at least the subset of haptic delivery nodes.

11. The method of claim 1, wherein each haptic delivery node of the plurality of haptic delivery nodes of the haptic delivery cluster is a microelectromechanical systems (MEMS) device.

12. A method for providing haptic effects, comprising:
    detecting, by a haptic control unit, user presence in a physical environment in which a haptic delivery cluster is located, wherein the haptic delivery cluster comprises a plurality of delivery nodes, wherein each haptic delivery node of the plurality of haptic delivery nodes: (a) is separate from other haptic delivery nodes of the plurality of haptic delivery nodes, (b) is at least one of a wireless communication device, a sensor, or a computing device, and (c) has a net electric charge or a net magnetic dipole;

determining, by the haptic control unit, a location at which the user presence is detected, activating, by the haptic control unit after the user presence is detected, a magnetic field generator in communication with the haptic control unit to cause the magnetic field generator to generate a magnetic field in the physical environment in which the haptic delivery cluster is located and to cause movement of the plurality of haptic delivery nodes towards the location at which the user presence is detected.

13. The method of claim 12, wherein each haptic delivery node of the plurality of haptic delivery nodes has a dimension that is less than or equal to 5 mm.

14. The method of claim 12, further comprising:

determining, by the haptic control unit, a path of movement of at least a subset of haptic delivery nodes of the haptic delivery cluster if the magnetic field generator is activated; and determining, by the haptic control unit, if the location at which the user presence is detected is on the path of movement of at least the subset of haptic delivery nodes of the haptic delivery cluster, wherein the step of activating the magnetic field generator is in response to a determination that the location at which the user presence is detected is on the path of movement of at least the subset of haptic delivery nodes.

15. The method of claim 12, wherein the magnetic field generator includes a conductive coil and a current source.

16. The method of claim 12, wherein a total number of the plurality of haptic delivery nodes in the haptic delivery cluster is in a range of 1,000 to 100,000 haptic delivery nodes, and wherein each haptic delivery node of the plurality of delivery nodes has a dimension that is in a range of 100 μm to 1 mm.

17. The method of claim 12, wherein each haptic delivery node of the plurality of haptic delivery nodes of the haptic delivery cluster is a microelectromechanical systems (MEMS) device.

18. A method for providing haptic effects, comprising:

detecting, by a haptic control unit, user presence in a physical environment in which a haptic delivery cluster is located, wherein each haptic delivery node of the plurality of haptic delivery nodes: (a) is separate from other haptic delivery nodes of the plurality of the haptic delivery nodes, and (b) is at least one of a wireless communication device, a sensor, and computing device;

determining, by the haptic control unit, a location at which the user presence is detected;

activating, by the haptic control unit after the user presence has been detected, a pneumatic actuator in communication with the haptic control unit to cause the pneumatic actuator to output a pulse of air in the physical environment in which the haptic delivery cluster is located and to cause movement of the plurality of haptic delivery nodes of the haptic delivery cluster towards the location at which the user presence is detected.

19. The method of claim 18, wherein each haptic delivery node of the plurality of haptic delivery nodes has a dimension that is less than or equal to 5 mm.

20. The method of claim 18, wherein the step of activating the pneumatic actuator is only in response to a determination that the plurality of haptic delivery nodes of the haptic delivery cluster is between the pneumatic actuator and the location at which the user presence is detected.

* * * * *